United States Patent [19]

Raymond et al.

[11] Patent Number: 4,675,840
[45] Date of Patent: Jun. 23, 1987

[54] SPEECH PROCESSOR SYSTEM WITH AUXILIARY MEMORY ACCESS

[75] Inventors: William J. Raymond, Barrington; Robert L. Morgan, Rolling Meadows; Ricky L. Miller, Elgin, all of Ill.

[73] Assignee: Jostens Learning Systems, Inc., Minneapolis, Minn.

[21] Appl. No.: 534,490

[22] Filed: Sep. 21, 1983

Related U.S. Application Data

[63] Continuation-in-part of Ser. No. 469,482, Feb. 24, 1983.

[51] Int. Cl.$^4$ ............................................. G10L 5/00
[52] U.S. Cl. ............................. 364/513.5; 364/200
[58] Field of Search ............. 364/513.5, 200 MS File, 364/900 MS File; 381/51–53

[56] References Cited

U.S. PATENT DOCUMENTS

| | | |
|---|---|---|
| Re. 30,991 | 7/1982 | Ostrowski . |
| 3,641,496 | 2/1972 | Slavin . |
| 3,654,619 | 4/1972 | Tishman . |
| 3,996,554 | 12/1976 | Ives et al. . |
| 4,000,565 | 1/1977 | Overby et al. . |
| 4,060,848 | 11/1977 | Hyatt . |
| 4,060,915 | 12/1977 | Conway . |
| 4,099,236 | 7/1978 | Goodman et al. .................. 364/200 |
| 4,163,120 | 7/1979 | Baumwolspiner . |
| 4,176,470 | 12/1979 | Fosner et al. . |
| 4,185,169 | 1/1980 | Tanimoto et al. . |
| 4,185,170 | 1/1980 | Morino et al. . |
| 4,189,779 | 2/1980 | Brautingham . |
| 4,209,366 | 6/1980 | Wiggins, Jr. et al. . |
| 4,209,781 | 6/1980 | Puri et al. . |
| 4,215,240 | 7/1980 | Ostrowski . |
| 4,234,761 | 11/1980 | Wiggins, Jr. et al. . |
| 4,266,096 | 5/1981 | Inoue et al. . |
| 4,272,649 | 6/1981 | Pfeiffer . |
| 4,276,444 | 6/1981 | Tanimoto et al. . |
| 4,281,994 | 8/1981 | Dell et al. . |
| 4,296,279 | 10/1981 | Stork . |
| 4,301,328 | 11/1981 | Dorais . |
| 4,304,964 | 12/1981 | Wiggins, Jr. et al. . |
| 4,304,965 | 12/1981 | Blanton et al. . |

(List continued on next page.)

FOREIGN PATENT DOCUMENTS 0054620 6/1982 European Pat. Off. .

OTHER PUBLICATIONS

Wickey, D. O., "Synthesizer Chip Translates LPC to Speech Econically", Electronic Design, vol. 29, Jun. 11, 1981, pp. 213–218.

Schmid, H., "Schnittstellen Zwischen Monolithischen Prozessoren und der Aussenwelt", Electronik, No. 11, 1980, pp. 67–72.

Lin, Kun-Shan, et al., "Software Rules Gives Personal Computer Real Word Power", International Electronics, vol. 53, No. 3, Feb. 10, 1981, pp. 122–125.

Schalk, T. B. et al., "Voice Synthesis and Recognition", Mini-Micro Systems, vol. 15, No. 12, Dec. 1982, pp. 146–160.

"Flexible Voice Response Unite Will Have Many Messages for Telephone Subscribers" Electronics, vol. 51, No. 3, Feb. 2, 1978.

*Primary Examiner*—E. S. Matt Kemeny
*Attorney, Agent, or Firm*—Fitch, Even, Tabin & Flannery

[57] ABSTRACT

A digital speech processor operates in parallel with a programmable digital computer to generate sequences of variable-length speech phases and pauses at the request of the computer. A speech memory region within the speech processor contains digitally-encoded speech data segments of varying length. A separate command memory region, can be loaded with a plurality of commands. When sequentially executed by the speech processor, these commands cause the processor to generate an arbitrary sequence of spoken phases and pauses without intervention by the computer. When the programmable digital computer is not operating the speech processor to synthesize spoken words, the speech and command memory regions are used as auxiliary random access memory to increase the size of the memory space of the computer.

21 Claims, 30 Drawing Figures

U.S. PATENT DOCUMENTS

| | | |
|---|---|---|
| 4,310,825 | 1/1982 | Tsunoda et al. |
| 4,312,065 | 1/1982 | Ulug . |
| 4,316,283 | 2/1982 | Ulug . |
| 4,317,196 | 2/1982 | Ulug . |
| 4,317,197 | 2/1982 | Ulug . |
| 4,319,083 | 3/1982 | Wiggins et al. . |
| 4,323,732 | 4/1982 | Wiggins et al. . |
| 4,331,836 | 5/1982 | Wiggins, Jr. et al. . |
| 4,334,306 | 6/1982 | Ulug . |
| 4,335,275 | 6/1982 | Brantingham . |
| 4,335,277 | 6/1982 | Puri . |
| 4,337,375 | 6/1982 | Freeman . |
| 4,375,097 | 2/1983 | Ulug . |
| 4,387,269 | 6/1983 | Hashimoto et al. ............ 364/513.5 |
| 4,398,059 | 8/1983 | Lin et al. . |
| 4,403,965 | 9/1983 | Hawkins . |
| 4,415,767 | 11/1983 | Gill et al. ......................... 364/513.5 |
| 4,519,027 | 6/1982 | Vogelsberg ......................... 364/185 |

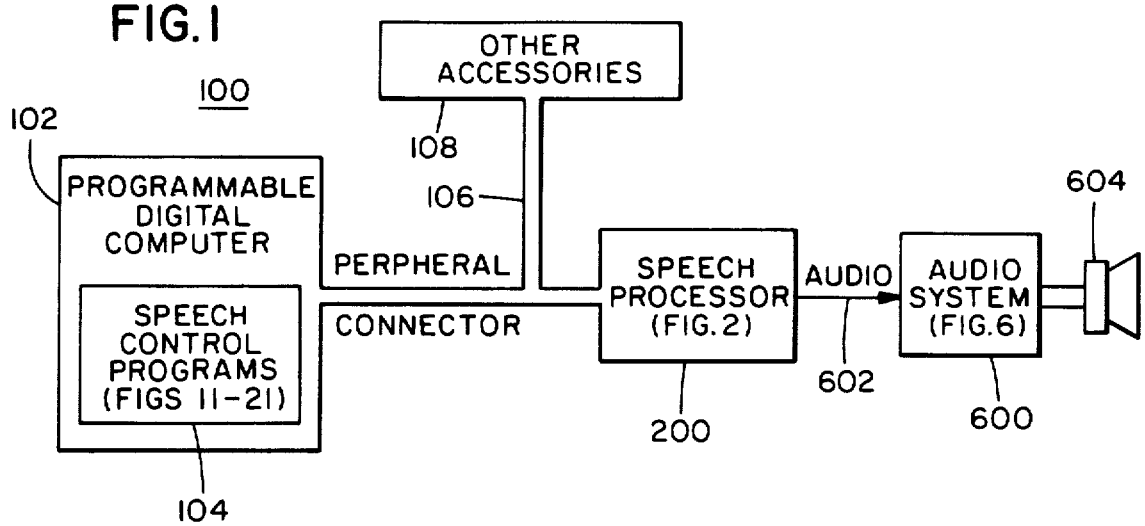
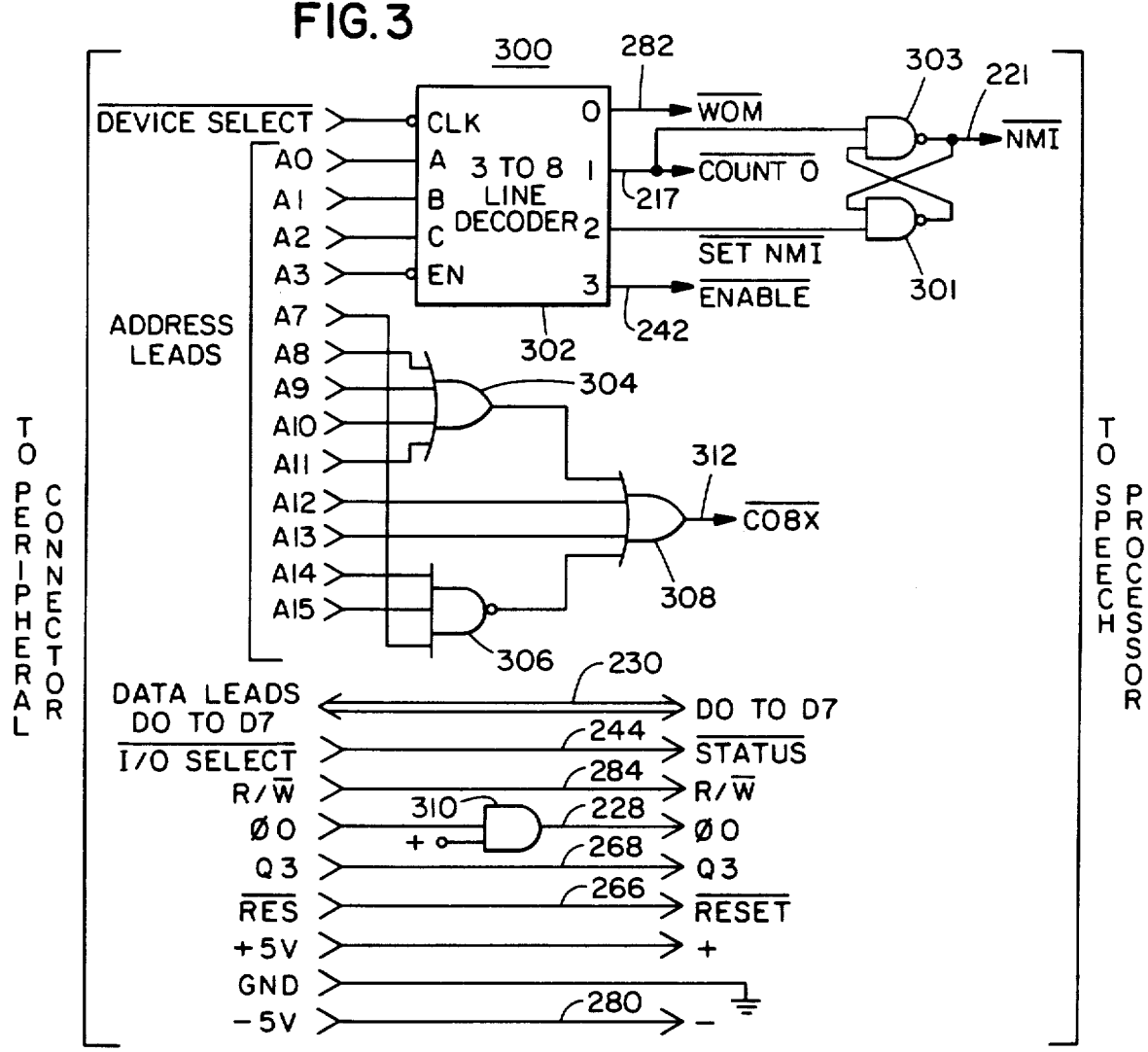

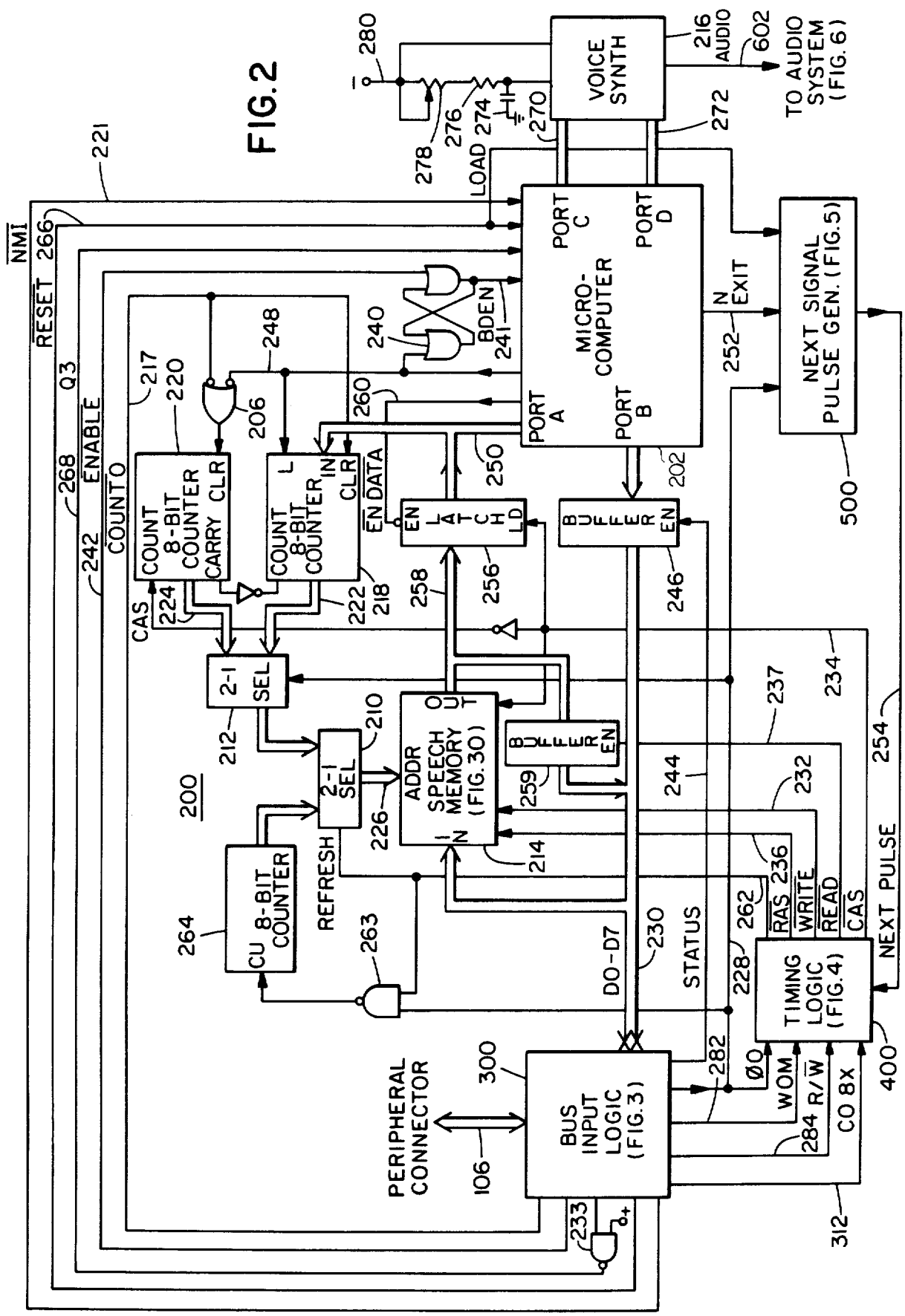

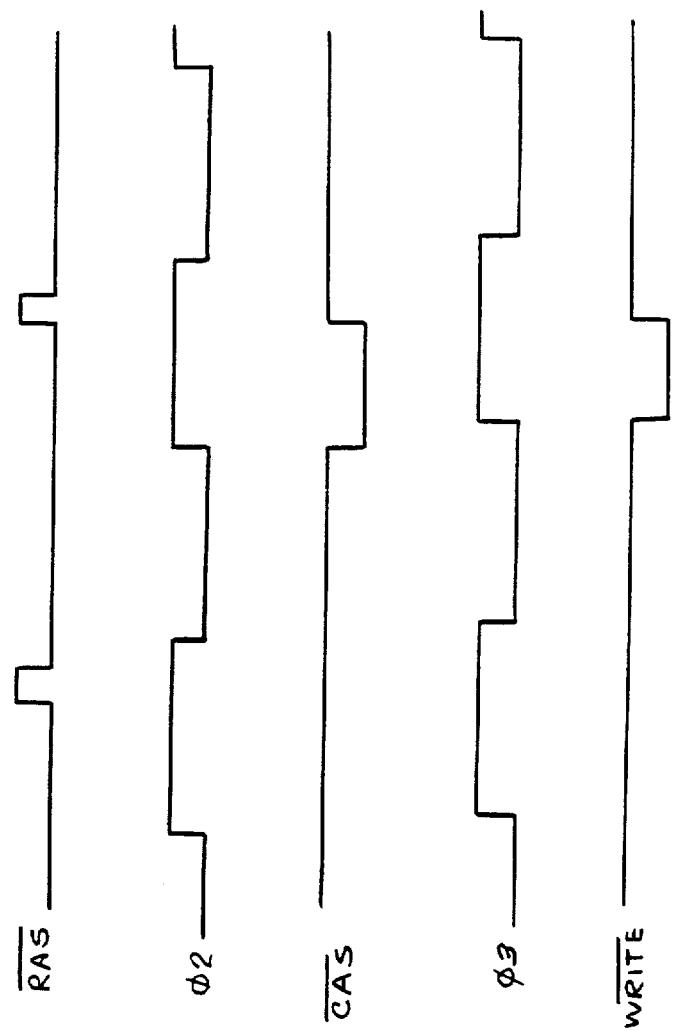
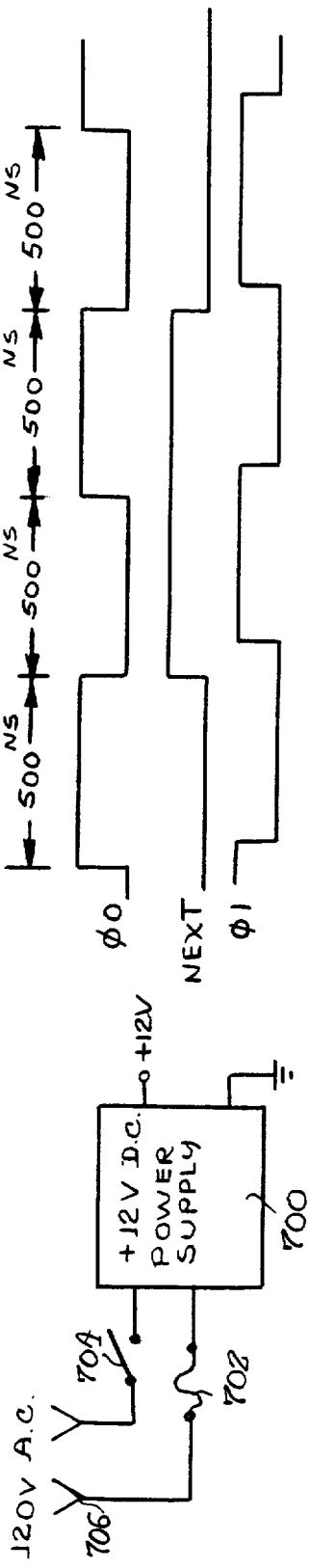
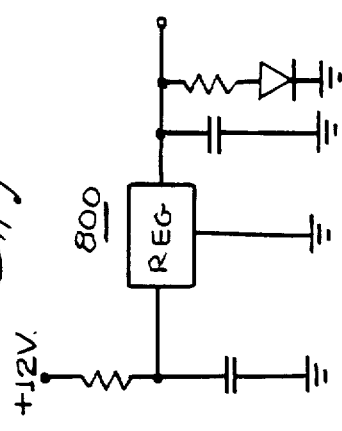

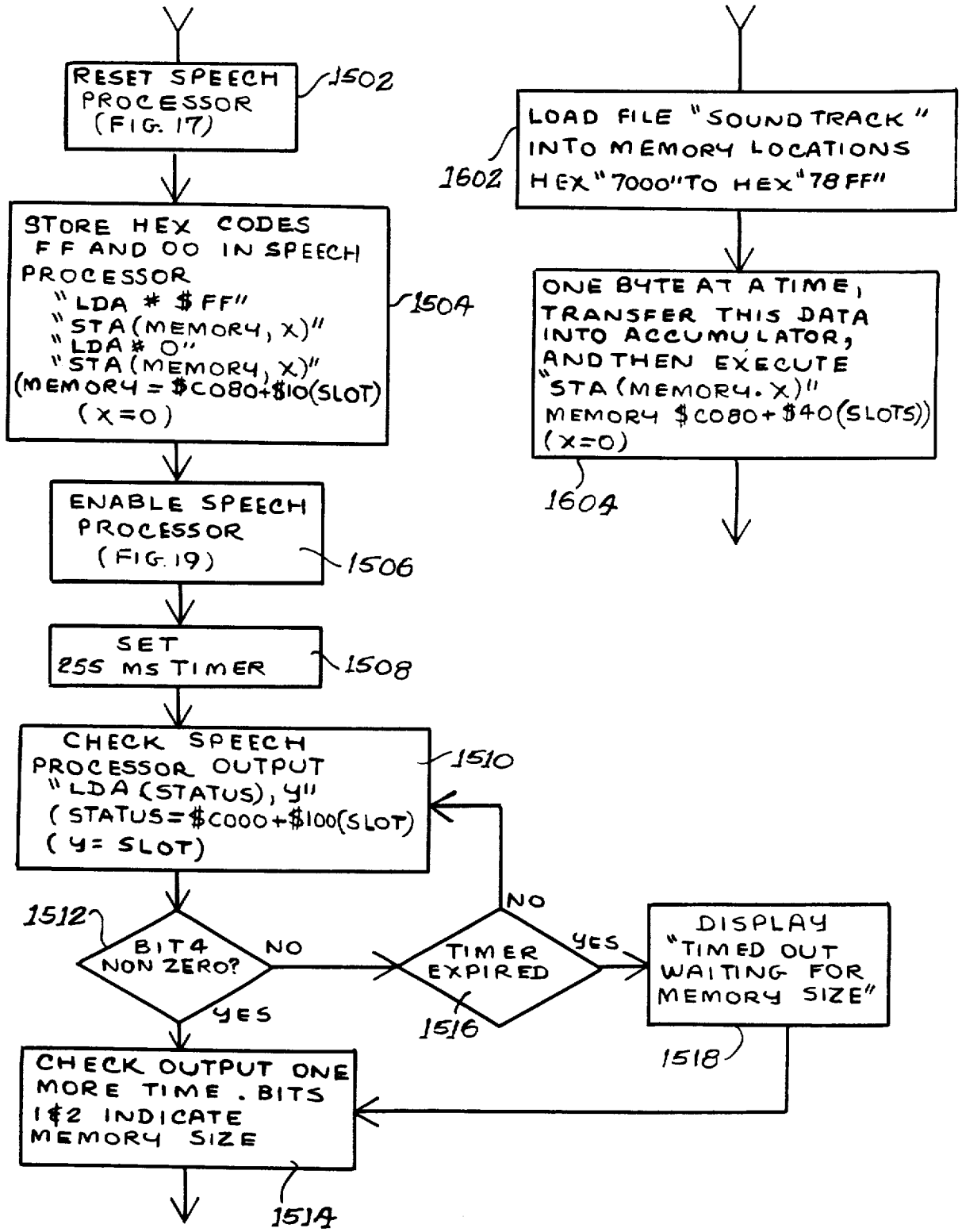

*Fig. 17.*

```
          │
          ▼
┌──────────────────────┐
│ RESET ADDRESS        │
│ COUNTER IN SPEECH    │
│ PROCESSOR            │
│ "LDA SLOT"           │
│ "LDA RESET TO 4"     │
│ (RESET TO = $C081)   │
└──────────────────────┘
          │
          ▼
```

*Fig. 18.*

```
              │
              ▼
         ( SAY THIS )
              │
              ▼
    ┌─────────────────────┐
    │ DISPLAY             │
    │ "HEX PHRASE #"      │  1802
    │ DISPLAY SPACE       │
    └─────────────────────┘
              │
              ▼
    ┌─────────────────────┐
    │ EXECUTE             │
    │ PACK                │  1804
    │ (FIG. 20)           │
    └─────────────────────┘
              │
              ▼
          ◇ FIRST
            HEX BYTE    ──YES──┐
            > 2?  1806          │
              │NO               │
              ▼                 ▼
         ┌─────────┐       ◇ FIRST
         │ SPEECH  │         HEX BYTE   ──YES── ERROR
         │ CODE    │         ≥ $C0?  1808         RETURN
         └─────────┘           │NO
              │                ▼
              │           ┌─────────┐
              │           │ DELAY   │
              │           │ CODE    │
              │           └─────────┘
              │                │
              ▼◄───────────────┘
    ┌─────────────────────────┐
    │ STORE FIRST             │
    │ HEX BYTE IN             │
    │ SPEECH PROCESSOR        │
    │ "STA(MEMORY, X)"        │  1810
    │ (MEMORY = $C080 +       │
    │ $10 (SLOT))(X=0)        │
    └─────────────────────────┘
              │
              ▼
    ┌─────────────────────┐
    │ EXECUTE             │
    │ PACK                │  1812
    │ (FIG. 20)           │
    └─────────────────────┘
              │
              ▼
    ┌─────────────────────┐
    │ STORE SECOND        │
    │ HEX BYTE IN         │
    │ SPEECH              │  1814
    │ PROCESSOR           │
    └─────────────────────┘
              │
              ▼
           RETURN
```

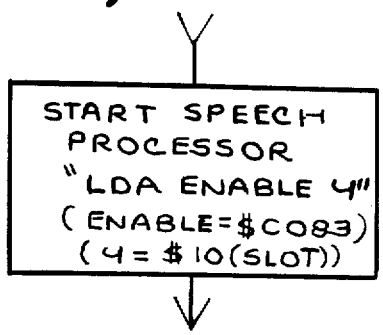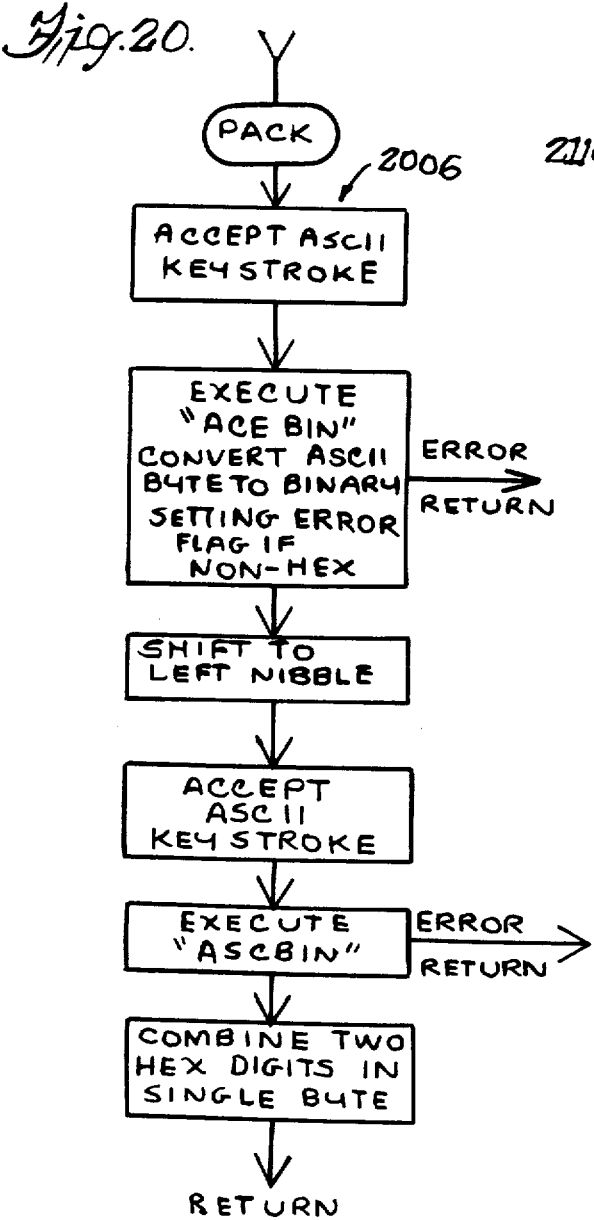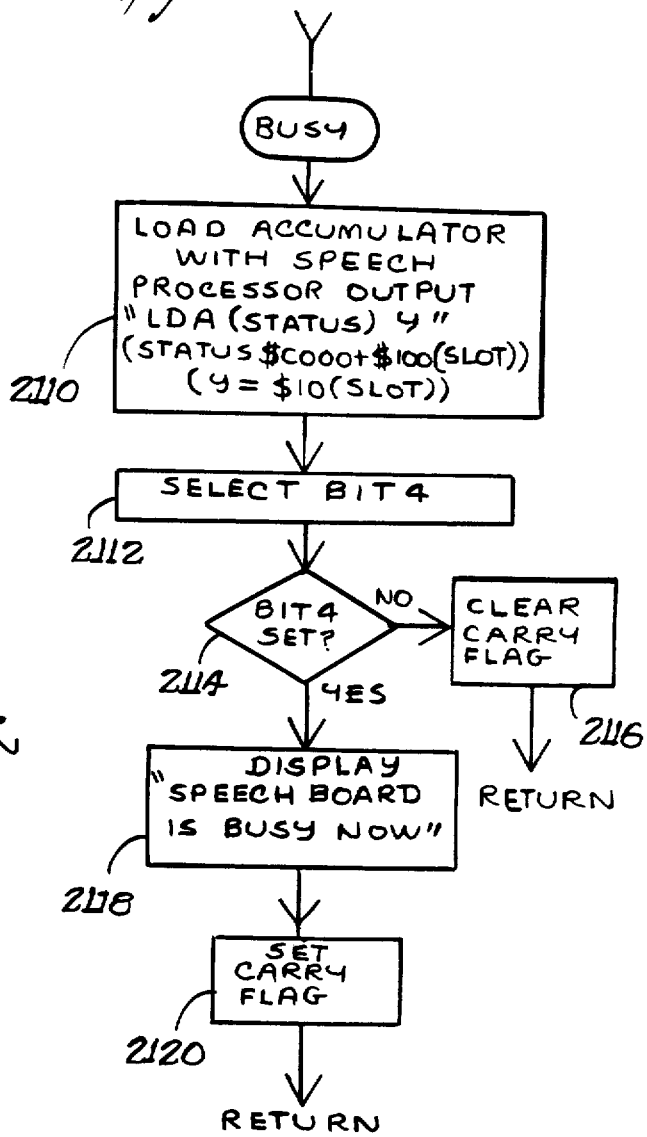

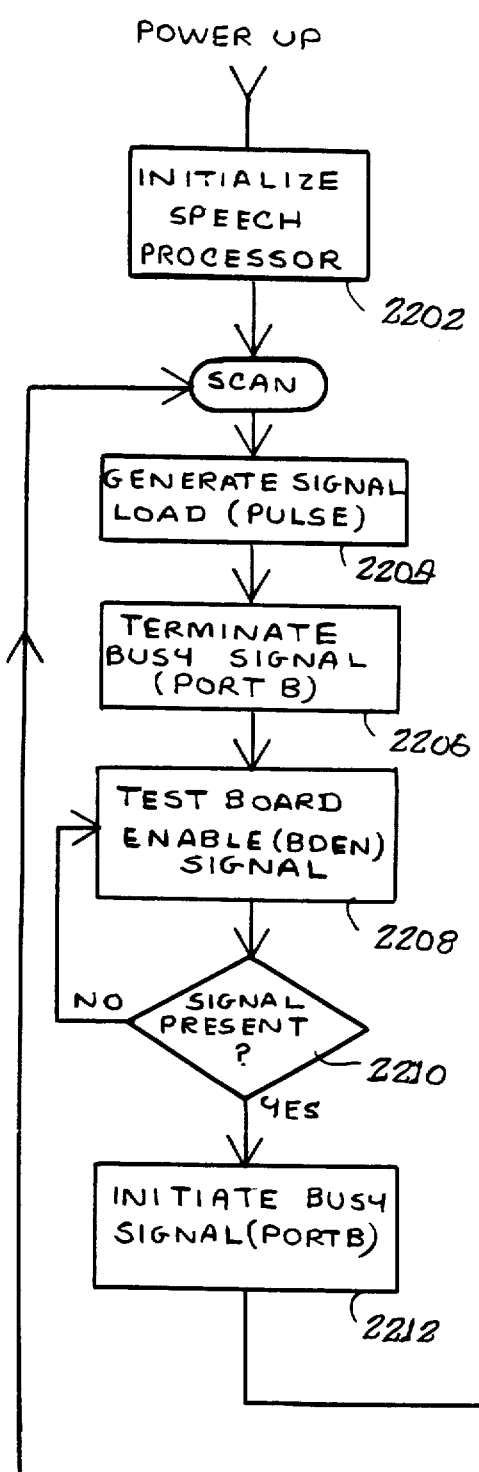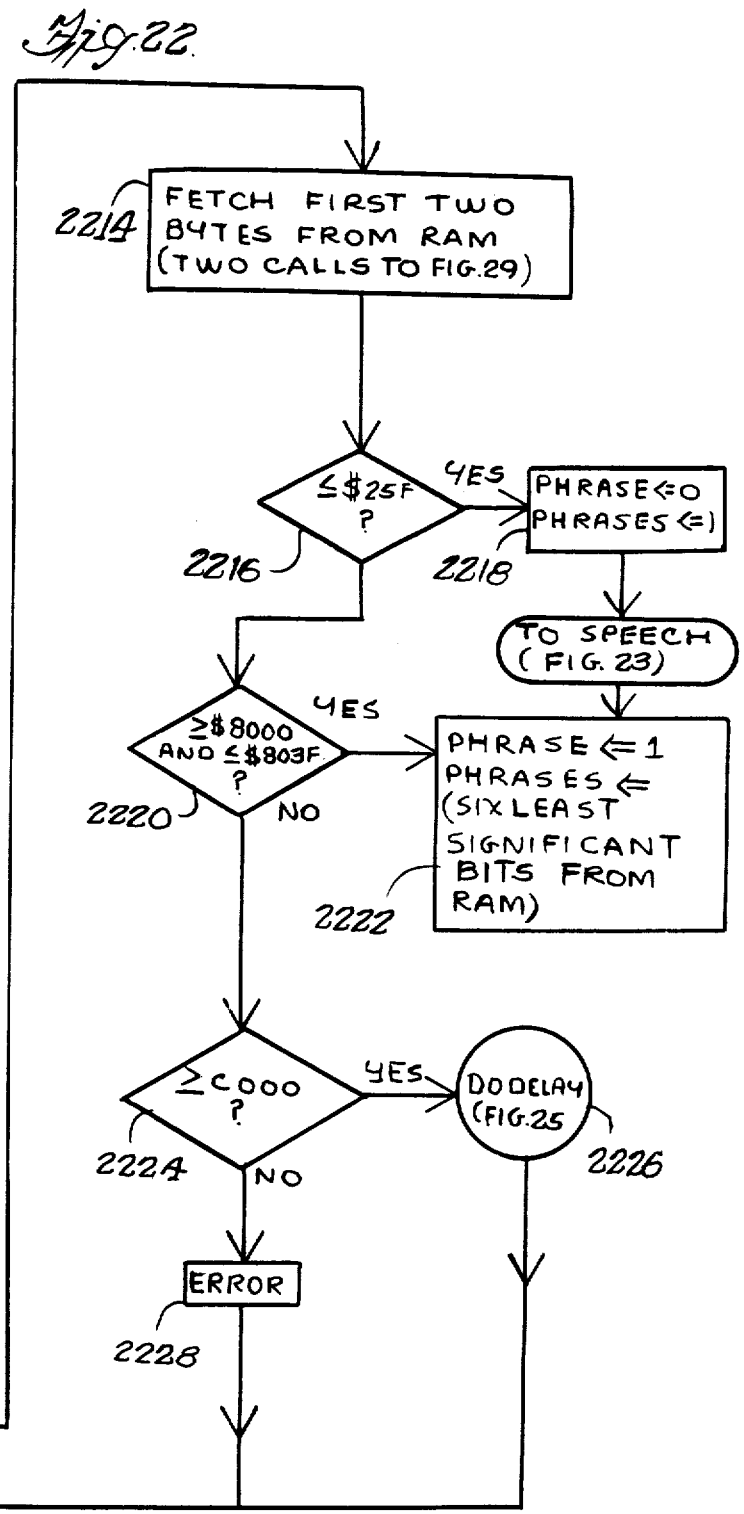
Fig. 22.

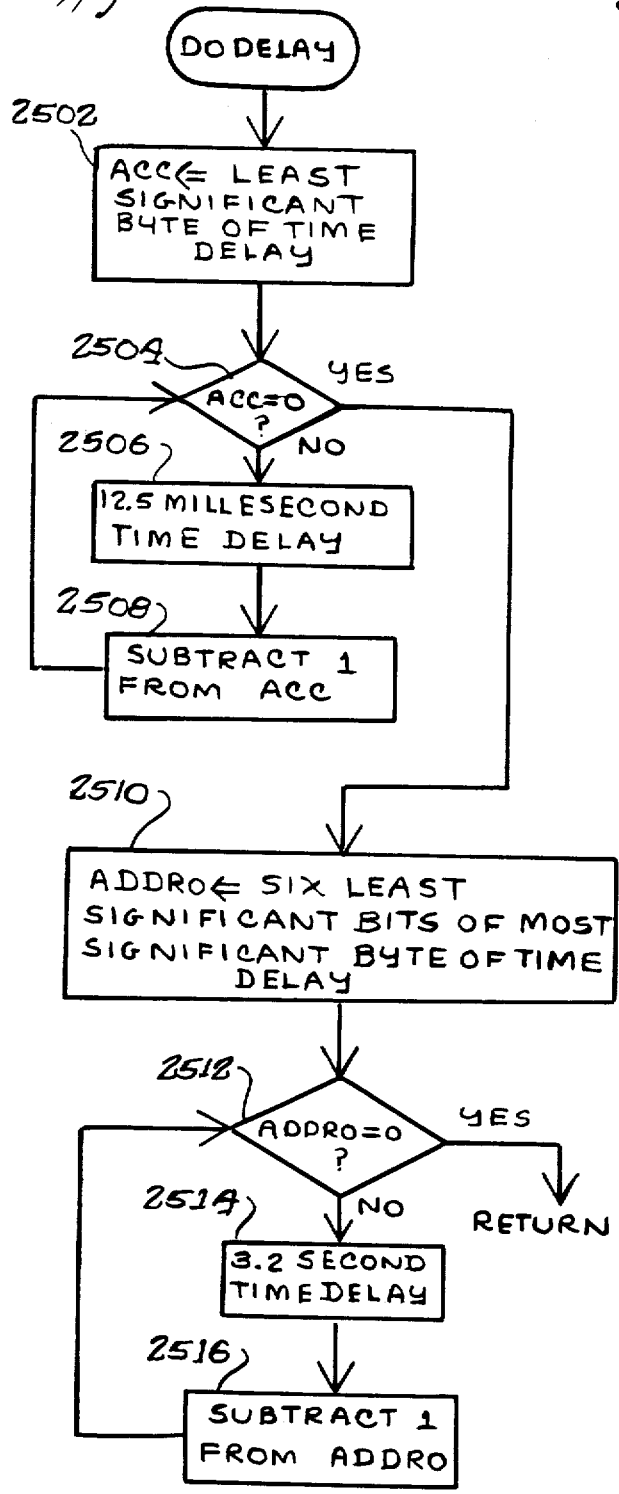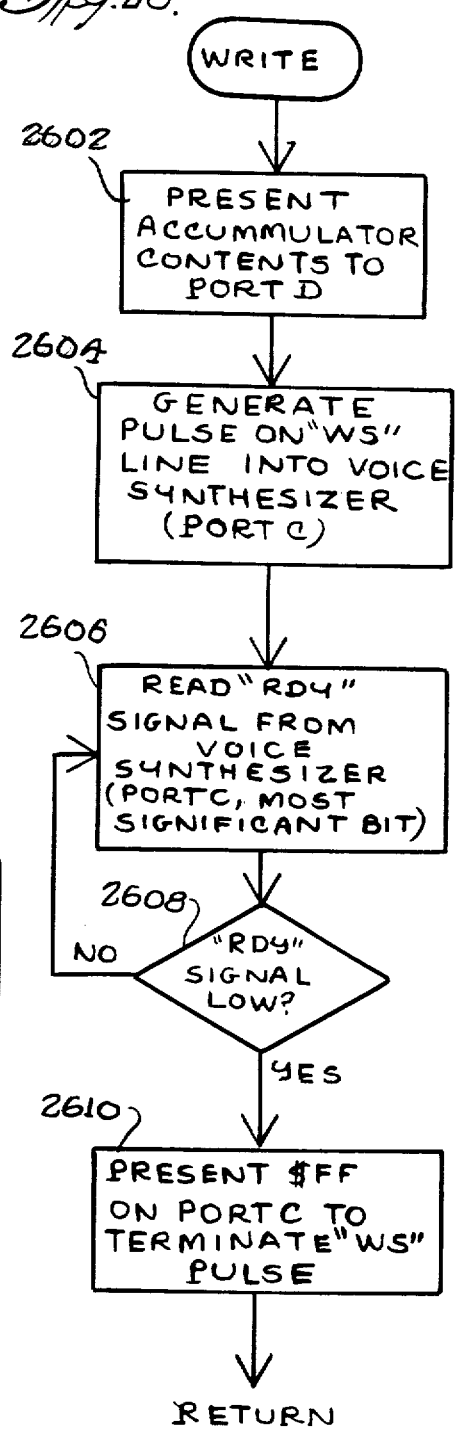

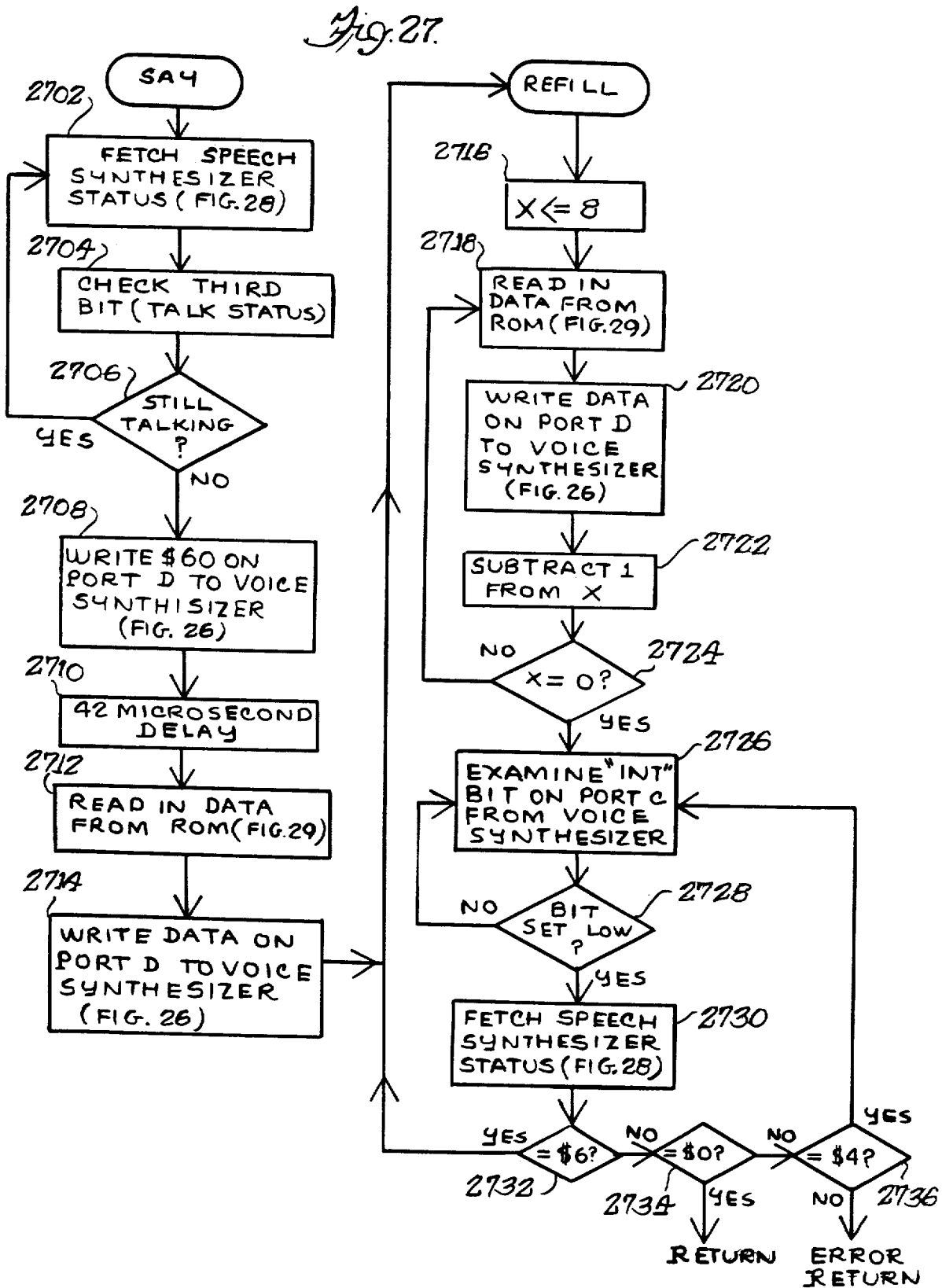

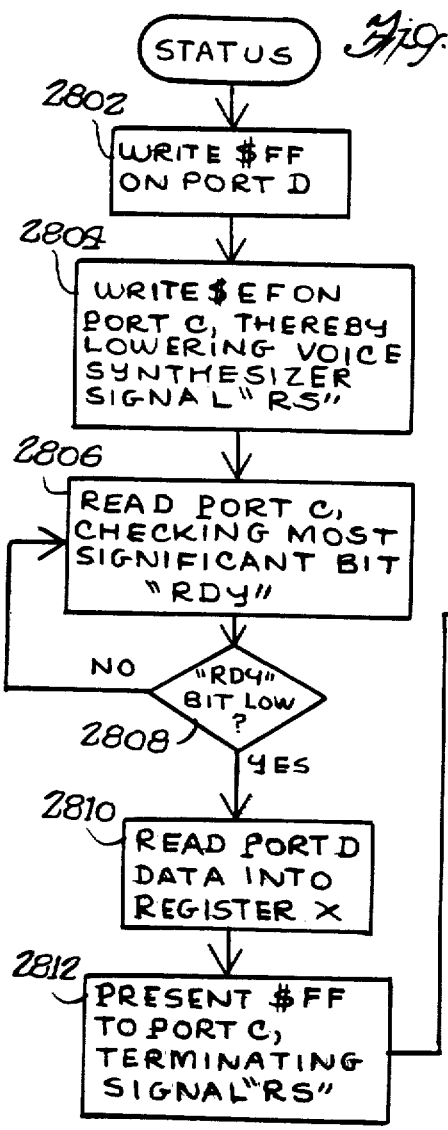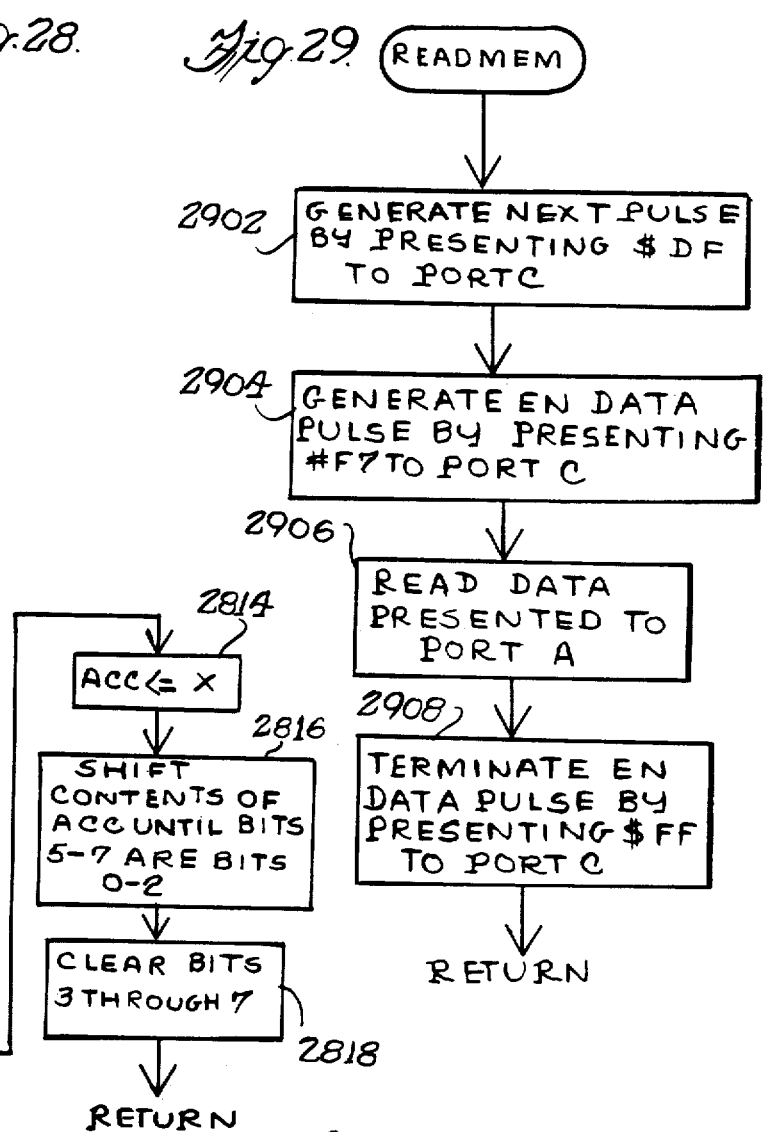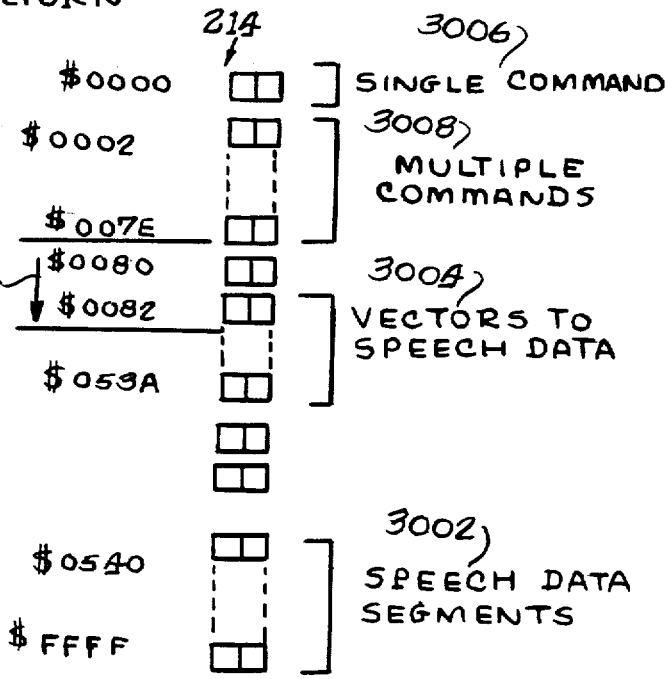

SPEECH PROCESSOR SYSTEM WITH AUXILIARY MEMORY ACCESS

CROSS REFERENCE TO RELATED APPLICATIONS

This application is a continuation in part of U.S. Ser. No. 469,482, entitled, "Phrase-Programmable Digital Speech System", filed on Feb. 24, 1983 in the names of William J. Raymond et al., which application is commonly assigned with the present application.

BACKGROUND OF THE INVENTION

The invention pertains generally to interactive computer systems, and is more particularly directed to such systems which include means for transforming digitally encoded speech data segments into understandable speech.

Digital speech processors that can operate in parallel with a programmable digital computer have come into wide spread use in recent years. An excellent example is the "Solid State Speech" synthesizer that is widely used as an accessory for the Texas Instruments TI99/4A home computer. This system includes a synthesizer chip which can accept a stream of data from a computer that defines the individual phonemes of a spoken message. The data stream, however, must be presented to the synthesizer at a controlled rate of speed and with a relatively continuous active involvement of the computer in the speech generation process.

An alternative arrangement is disclosed in U.S. Pat. No. 4,335,277 which issued on June 15, 1982 to Ajay K. Puri. A read-only memory containing a plurality of variable length, digitally-encoded speech data segments is connected to a synthesizer that is connected in turn to a computer. The computer can initiate the conversion of an entire single data segment into speech by passing the address of the desired segment to the read-only memory and then starting the synthesizer chip to speak from that address onward. In this manner, a single speech segment may be generated in response to a single request from the computer, with no further computer intervention.

The above referenced application by Raymond et al. describes another speech synthesis system which uses a speech memory to store variable-length, digitally-encoded speech data segments and a command memory to store variable-length sequences of compact commands. A speech processor under the command of a programmable personal computer executes the stored instructions which in conjunction with the coded data segments generates speech from an audio portion of the system. The personal computer is adapted for writing to arbitrary areas in the speech and command memories to program any messages desired for synthesis into spoken words. This system thus provides an advantageous speech synthesis apparatus for a personal computer and allows the computer to do other parallel tasks such as graphics while the speech synthesizer is providing audible messages to the user.

Generally, personal computers such as the one described in the Raymond et al. application, have a modular memory architecture. When one purchases the computer it is equipped with a certain size random access memory for example, the Apple II+ is initially provided with 48K bytes of random access memory which can then be expanded in modules of 16K. As another example, the newer Apple IIe is initially provided with 64K bytes of memory which can then be expanded in modules of 64K. The additional memory modules conventionally interface with the address, data, and control bus structure of the computer through a peripheral connector which is physically embodied as a number of printed circuit card edge connectors. On the Apple II+ computer, the peripheral connector includes eight slots or edge connectors which provide positions to plug in additional memory modules or other accessories such as disk drives and controllers, printers, local area networks interfaces, modems, etc. In the illustrated embodiment of the speech synthesizer described in the above referenced application by Raymond et al. the synthesizer is connected to its host Apple II+ computer in this manner.

This modularity provides the owner with the flexibility to build a system configuration of his own choice. However, when making decisions on the connecting of peripherals and the overall configuration some trade offs are inevitable. If a particular application necessitates more RAM, then a disc drive controller or a modem may have to be excluded. If the operator desires the speech synthesis capability of the referenced application by Raymond et al. then some other peripheral or a memory module may have to be displaced from the system. The owner must therefore make judicious choices in filling the limited number of peripheral slots.

In the common multiuse environment for a personal computer, the speech synthesis system will not be operating at all times. Other programs not requiring speech synthesis are commonly run on the same system as those programs having speech capability. Therefore, during those programs not requiring the speech feature, the speech and command memories of Raymond et al. are idle and the personal computer has no means for accessing the speech memory. If the personal computer owner needs additional memory when using another program not using the speech feature he would unplug the speech synthesizer module and plug in an additional memory module. This is not only an inconvenience to have to reconfigure the system for different uses but is also expensive as the owner has to bear the expense of owning two modules, one for speech synthesis and another for full memory capability.

Therefore, it would be highly advantageous to provide a speech synthesizer system having a speech and command memory with means for accessing the memory by the personal computer during its periods of non-use as a speech synthesizer.

SUMMARY OF THE INVENTION

The invention provides computer system with a speech synthesizer having a speech memory which can be used as a sequential access memory by a personal computer when not synthesizing speech.

An advantage of a computer system with a speech processor having this capability is that a personal computer owner can, by owning one module, have a system that performs as though an extra memory module was present. The speech processor, when not in use for synthesizing speech, becomes transparent to the personal computer and is used as part of the overall memory space.

An additional advantage is that the computer can read what has been written into the speech memory when the system is synthesizing speech. A check to determine if the data written into the speech memory is being stored accurately can be accomplished by the feature.

Accordingly, the invention comprises a programmable computer having a defined memory space and a speech processor having a voice synthesizer, speech memory, a programmable microcomputer, and means for connecting the speech memory to the voice synthesizer. The microcomputer is programmed with control programs to scan the speech memory and respond to data entries therein by transferring data from said speech memory to the voice synthesizer. The speech processor further includes first and second data conveyance means connecting the computer to the speech memory for writing to and reading from the memory, respectively.

When programmed to use the speech synthesis mode, the computer will enable a control line which initiates the parallel operation of the microcomputer by starting its control programs. In this mode speech synthesis will take place in parallel with other of the computers operations such as graphics or the like. Otherwise, the computer will in an auxiliary mode use the speech memory as a portion of its memory space to be written into or read from as desired. If the computer will be using the speech synthesis mode, then the speech memory is loaded with command data and speech data to be operated on by the microcomputer. If the speech memory is to be used for auxiliary memory space then the computer can load whatever data needs to be stored therein.

Because of the sequential nature of the addressing circuitry for the particular embodiment illustrated, the speech memory is extremely well adapted for list or file processing. One use of the speech processor memory in the auxiliary mode would be to receive files as they were read off a hard or floppy disc and to store them in the sequence read. Thereafter, by setting up a table of pointers to the starting address of the files, each file can be read individually by the personal computer for data manipulation and processing.

Further objects and advantages of the invention will become apparent in the detailed description of the invention that follows when read in conjunction with the drawings. The features of novelty that characterize the invention are pointed out with particularly in the claims annexed to and forming a part of this application.

BRIEF DESCRIPTION OF THE DRAWINGS

FIG. 1 is an overview block diagram of a digital speech system 100 designed in accordance with the present invention;

FIG. 2 is a partly block, partly logic, and partly circuit diagram of a speech processor 200 that is a part of the speech system 100;

FIG. 3 is a logic diagram of a bus input logic 300 element of the speech processor 200;

FIG. 7 is a partly circuit and partly block diagram of a +12 volt power supply 700 for the audio system 600;

FIG. 8 is a partly circuit and partly block diagram of a +5 volt power supply 800 for the speech processor 200;

FIG. 9 is a timing diagram illustrating the timing relationships of signals in FIGS. 4 and 5;

FIG. 14 is a flow diagram of the routine 1002 in FIG. 10;

FIG. 15 is a flow diagram of the routine 1004 in FIG. 10;

FIG. 16 is a flow diagram of the element 1010 in FIG. 10;

FIG. 17 is a flow diagram of the element 1204 in FIG. 12, the element 1306 in FIG. 13, and the element 1502 in FIG. 15;

FIG. 18 is a flow diagram of the element 1206 FIG. 12 and the element 1318 in FIG. 13;

FIG. 19 is a flow diagram of the element 1210 FIG. 12 the element 1326 in FIG. 13, and the element 1506 in FIG. 15;

FIG. 20 is a flow diaqram of a subroutine PACK that is called by the routine illustrated in FIG. 18;

FIG. 21 is a flow diagram of a subroutine BUSY that is called at 1202 in the SIMA portion of the speech control program 104 shown in FIG. 12 and that is also called at 1302 in the SIMB portion of the speech control program 104 shown in FIG. 13;

FIG. 22 is a flow diagram of the first half of the main part of the processor control program 204 which controls the microcomputer 202 of the speech processor 200;

FIG. 25 is a flow diagram of the subroutine DODELAY that is called at 2226 in FIG. 22 and at 2329 in FIG. 23;

FIG. 26 is a flow diagram of the subroutine WRITE that is called at 2708, 2714, and 2720 in FIG. 27;

FIG. 27 is a flow diagram of the subroutine SAY that is called at 2420 in FIG. 24;

FIG. 28 is a flow diagram of the subroutine STATUS that is called, at 2702 and 2730 in FIG. 27;

FIG. 29 is a flow diagram of the subroutine READ-MEM that is called at 2214 in FIG. 22; at 2314, 2318, and 2322 in FIG. 23; at 2402 and 2412 in FIG. 24; and at 2712 and 2718 in FIG. 27; and FIG. 30 is a memory map indicating what data is stored in what locations within the speech memory 214 of the speech processor 200.

DESCRIPTION OF THE PREFERRED EMBODIMENT

Figure 4:
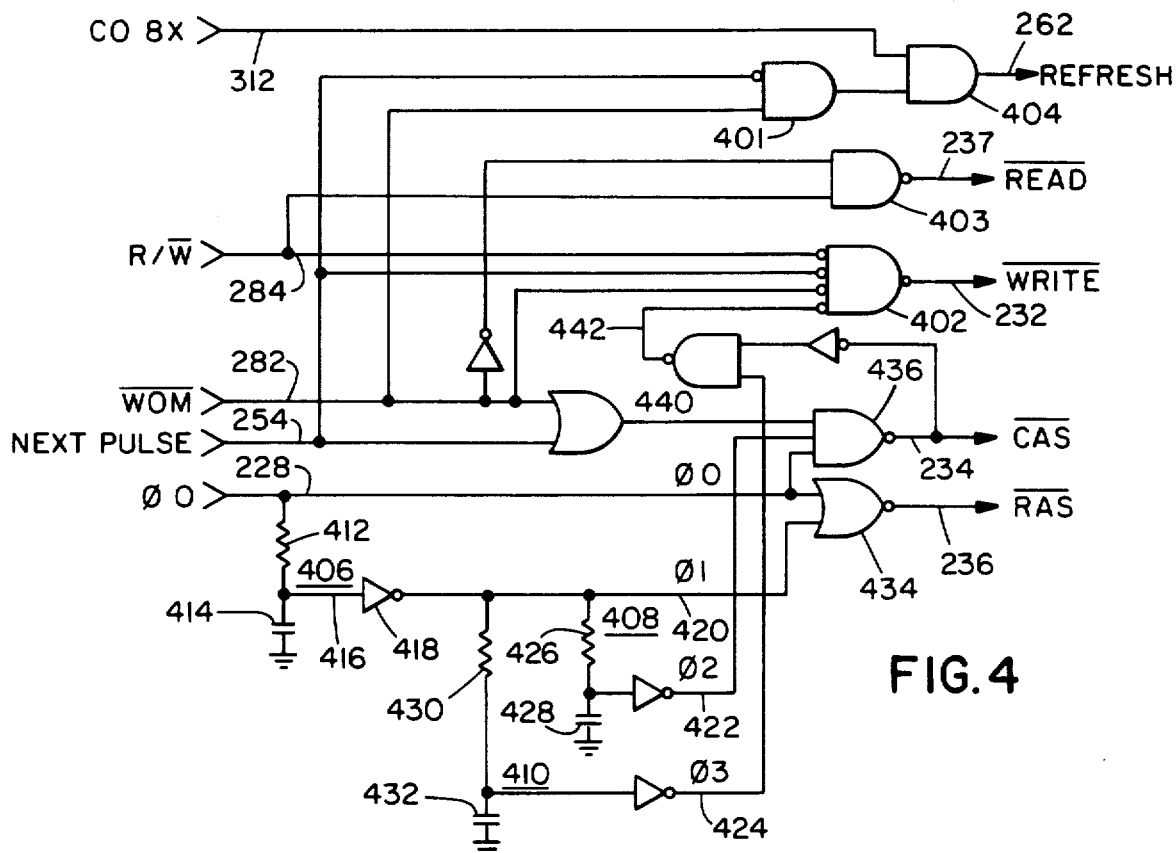
FIG. 4 is a partly logic and partly circuit diagram of a timing logic 400 element of the speech processor 200.

FIG. 1 presents an overview block diagram of a digital speech system 100 designed in accordance with the present invention. The system 100 includes a programmable digital computer 102. While many types of computers can be used in implementing the invention, the Apple II+ computer manufactured by Apple Computer, Incorporated, was selected for use in constructing the preferred embodiment of the invention because of its suitability for use in computer-aided instruction, its relatively low cost, and its present popularity among educators. The computer 102 typically would include a keyboard and a display monitor (not shown). Other accessories 108 of the computer 102 are attached to the computer 102 by means of a peripheral connector 106, and these might include disk drives and disk controllers, interfaces to external devices such as printers, local area networks, centralized computers, alternative central processing units, extra banks of memory, and other accessories 108. On the Apple II+ computer, the peripheral connector 106 includes eight Winchester #2HW25CO-111 50 pin printed circuit card edge connectors, the wiring of which are described on pages 105 to 109 of the book "Apple II Reference Manual" published in 1979 by Apple Computer, Incorporated. Hence, eight accessories may be connected to the Apple II+ peripheral connector. Other compact programmable digital computers provide equivalent peripheral connectors or equivalent connector means for enabling accessories to exchange information with them.

In a preferred embodiment, the present invention contemplates connecting a speech processor 200 to the computer 102 by means of the peripheral connector 106. The speech processor 200 generates an output signal AUDIO 602 that is fed into an audio system 600 where the signal is filtered and amplified and fed to a speaker 604, which may be a loudspeaker as shown or a set of headphones, the headphones being possibly more appropriate for use in a classroom setting. The speech processor 200 and some or all of the audio system 600 can be mounted on a printed circuit board that plugs into the peripheral connector 106. The computer 102 can then be adapted for speech use by the simple act of inserting the speech processor 200 into a slot in the peripheral connector 106, leaving part or all of the audio system 600 and speaker 604 in a separate housing external to the computer.

The insertion of the speech processor 200 into a slot in the peripheral connector 106 additionally provides access to the 64K of memory stored thereon. Since the speech processor is connected to the data, address, and control bus of the computer 102 via the connecter 106, the memory of the board when not being used for speech processing is adapted to become an extension of the memory space available to the user.

In accordance with the teachings of the present invention, the programs of the computer 102 are augmented by the addition of a speech control program 104. The program 104 may take many different forms, and it may simply be part of a computer-aided instructional program that also performs many other tasks, such as monitoring keystrokes, writing letters, numbers, symbols, and colors on a display monitor, accessing data and programs stored on external memory files, and the like. But whatever its form and main function, the program 104 includes the necessary commands, instructions, and subroutines to communicate with the speech processor 200 and to cause speech to flow from the loudspeaker 604.

In the detailed description that follows, an exemplary program 104 is described which is used to demonstrate the operation of the speech processor 200 with an operator typing in hexadecimal numbers to the computer 102 to initiate the production of corresponding elements of speech. The program 104 disclosed herein thus simulates how the system would function if a computer aided instructional exercise were supplying the hexadecimal numbers calling for the generation of speech rather than an operator on a keyboard.

DESCRIPTION OF THE WIRED PORTIONS OF THE SYSTEM

The wiring details of the speech processor 200 and audio system 600 are set forth in FIGS. 2 through 8 of the drawings. These figures are partly block diagrams, partly logic diagrams, and partly circuit diagrams.

The logic diagrams, FIGS. 2 through 8, follow the following conventions: A signal is either a "normal" signal or an "inverted" signal. The names of signals are capitalized. If a signal name is overlined in the drawings and if a signal enters logic gates through a circle, then the signal is inverted. Inverted signals are "present" when at ground potential and "absent" when positive. If a signal name is not overlined and if a signal does not enter logic gates through a circle, then the signal is normal. Normal signals are "present" when positive and "absent" when at ground potential. Since the inverted or normal nature of a signal is apparent in the drawings, no mention of the normal or inverted state of a signal is normally made in this description. Instead, signals are simply described as "present" or "absent."

Figure 5:
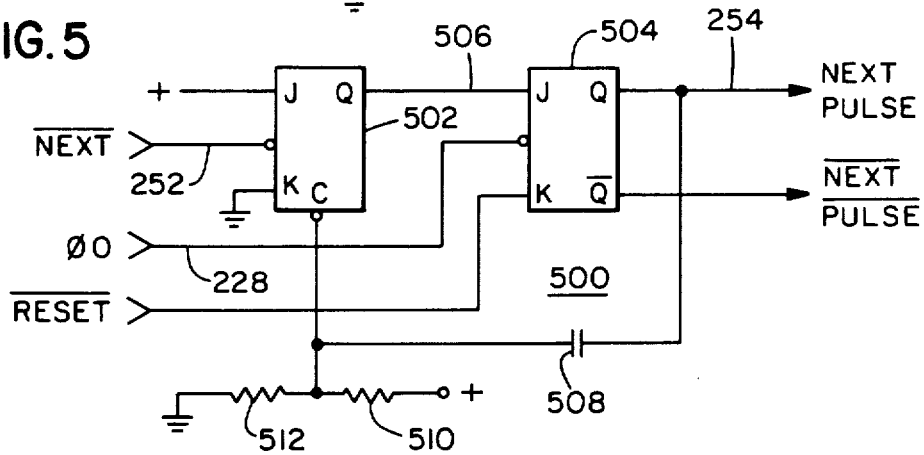
FIG. 5 is a partly logic and partly circuit diagram of a next signal, pulse generator 500 element of the speech processor 200.

Logic elements shaped like a letter "D" (for example, the gate 402 in FIG. 4) are control gates that "enable" the flow of one signal only if all the other signals entering the same gate are "present." Logic elements shaped like bullets or arrows (for example, the gate 206 in FIG. 2) are signal combining gates that permit any input signal to flow through the gate to its output. Triangular gates (for example, the gate 208 in FIG. 2) simply invert a signal from normal to inverted or vice versa, and these gates are frequently not even mentioned in the description that follows, since their function is made clear in the drawings. The rectangles 502 and 504 in FIG. 5 are "J-K master-slave" flip flops whose operation is described briefly below and much more fully in any textbook on digital logic design. Conventional symbols for circuit and logic components are used throughout the speech processor 200. Transistor-transistor logic may be used in constructing the logical portions of the system.

The actual circuit configuration of the preferred embodiment differs somewhat in its details from the logic diagrams shown but gives rise to identically the same logical signal processing steps as these shown. For example, the two, 2-1 select gates 210 and 212 in FIG. 2 were actually constructed from a single 4-1 select gate having two control inputs and four, eight-line signal inputs, two of which eight-line signal inputs have their signal lines strapped together to provide three eight-line signal inputs. The intention of the figures is to explain, as clearly as possible, the logical relationships that exist between the signals, rather than a particular combination of logic chips that give rise to that logical relationship.

The Speech Processor 200

With reference to FIG. 2, an overview of the speech processor 200 is presented. At the heart of the speech processor 200 lies a microcomputer 202 preferably which generates the control signals that control the operation of the speech processor 200. The microcomputer 202 is a Rockwell International Corporation R6500/1 Microcomputer System, the details of which are described in a publication dated June 1979 entitled "Document No. 29650-N48: R6500 Microcomputer System PRODUCT DESCRIPTION R6501/1 ONE-CHIP MICROCOMPUTER" published by Rockwell International Corporation. The speech processor 200 also contains a speech memory 214 which is a 64K byte random access memory device constructed from up to eight 64K bit dynamic random access memory units No. TMS4164 manufactured by Texas Instruments, Incorporated. In addition, the speech processor 200 contains a voice synthesizer chip 216, Model TMS 5220 also manufactured by Texas Instruments Incorporated. The voice synthesizer chip 216 is fully described in the Texas Instruments publication DM-02 dated June 1981 and entitled "TMS 5220 Voice Synthesis Processor Data Manual."

The speech memory 214, if the speech processing mode is to be used, is first loaded with speech data by the computer 102. The memory 214 has the capacity to hold about five minutes worth of speech which may be broken up into up to 608 discrete speech data segments. To load the memory 214 with speech data, the computer 102 first generates the necessary peripheral connector 106 signals to cause bus input logic 300 to generate a COUNT 0 signal 217. This signal 217 resets an 8-bit counter 218 to a zero count and also passes through a gate 206 and resets an 8-bit counter 220 to a zero count. The outputs 222 and 224 of these two counters are alternately connected by the 2-1 select logic 212 and by the 2-1 select logic 210 to the ADDR input 226 of the speech memory 214. The 2-1 select logic 212 is driven by the phase 0 timing signal (see timing diagram FIG. 9) into alternate states at a rapid rate and in order to present a complete 16-bit memory address to the speech memory 214 once during each complete cycle of the phase 0 signal 228. Accordingly, the counters 218 and 220 determine which location within the memory 214 is to be accessed, and the COUNT 0 signal 217 has forced these counters to location $0000. (The dollar sign indicates a hexadecimal number).

Having set the address counters for the speech memory 214 to zero count, the computer 102 may now proceed to write data into successive locations within the speech memory 214. The computer 102 presents the data, one byte at a time, to the peripheral connector 106 data leads D0-D7 230 and simultaneously generates the necessary signals to cause the bus input logic 300 and timing logic 400 to generate a WRITE signal 232 (enabling the speech memory 214 to accept new data) and a CAS signal 234. The CAS signal 234 and an immediately preceding RAS periodic timing signal 236 cause the speech memory 214 to accept a byte of data from D0-D7 230 and to store this byte in location $0000. Every CAS signal 234 also advances the 8-bit counter 220 by a single count because of its connection to the count input of the device.

The above process is repeated until all the necessary data (up to 64K bytes) has been loaded into the speech memory by the computer 102. Each time a new byte is presented, the CAS, RAS, and WRITE signals 234, 236 and 232 load the byte into the speech memory 214, and the CAS signal adds one to the address count presented by the counters 218 and 220 (which are interconnected such that overflow or carry output from the counter 220 flows into the count input of the counter 218 through a gate 238).

The computer 102 may thus load speech or other data into the speech memory 214 just about as rapidly as it can load data into its own internal memory.

It is seen that the process of writing data into the speech memory 214 is advantageously accomplished by the computer 102 under control of the signals it supplies to the bus input logic 300. Thus, the data being written into the speech memory can later be used as speech data by the microcomputer 202 or as other retrievable data by the computer 102. The computer 102 when it loads the speech memory 214, therefore inputs the data according to the use which will be made of it. If the computer 102 is programmed for speech synthesis then the memory 214 will be loaded with speech data and if programmed for general operation the memory 214 will be loaded with general purpose retrievable data, for example, a list or multiple files which can easily be stored in the sequential manner described.

To read the general purpose data from memory 214, the computer 102 reverses the loading process. The COUNT 0 signal 217 is generated by the bus input logic 300 to counters 218, 220. The signal 217 resets the counter 218 to a zero count and also passes through the gate 206 and resets the counter 220 to a zero count.

Having set the address counter for the speech memory to a zero count, the computer 102 may now proceed to read data from successive locations within the speech memory 214. The computer 102 executes the read operation by generating the necessary signals to cause the bus input logic 300 and the timing logic 400 to generate a READ signal 237, a RAS signal 236, and a CAS signal 234. The CAS and RAS signals cause a strobe of the memory 214 at the location addressed (in this instance $0000) and the contents of that address to be output on a bus 258. The data on bus is returned to the computer 102 via the data bus lines D0-D7 230. A buffer 259 connects the data bus 258 to the data bus 230 when enabled by the READ signal 237. As was previously described the CAS signal 234 increments the address counters 218, 220 so that they point to the next location $0001. The computer 102 can thus repeat this read sequence as often as is required to access the general purpose data that is stored in memory 214.

Within the speech memory 214, if the device is being used for speech synthesis, the speech data is organized as illustrated in FIG. 30. The variable-length speech data segments, each containing whatever data is required to cause the voice synthesizer to generate a voice message, are stored one after another in the locations beginning at $0540 and extending to the end of the memory (or to the end of the speech data). For each such segment, the two-byte address of the location in the speech memory where that segment begins is stored in any one of the pairs of locations within the range labeled vectors to speech data 3004 (FIG. 30).

The segment address, for example, the one stored at 3005 (FIG. 30), of a speech data segment is the displacement (or index) away from memory location $0080 of the vector for that segment divided by two. Hence, the segment address for the phrase whose vector (or starting address) is stored in the locations $0082 and $0083 is $1; the segment address for the phrase whose vector (or starting address) is stored in the locations $0084 and $0085 is $2; and so on. Hence, a segment address is a number between $0 and $25F that can be used to identify a specific phrase. When doubled and added to $0080, the phrase address becomes the address of the location where the address of the start of the phrase is stored within the speech memory 214.

The first two locations $0000 and $0001 within the speech memory 214 comprise the single command location 3006. Whenever the computer 102 wishes to have the speech processor 200 produce speech, the computer 102 proceeds as described above and causes the speech address counters 218 and 220 to be set to zero count. Next, the computer 102 feeds two bytes of data into these first two locations in the manner described above. Then the computer 102 actuates the signals from peripheral connector 106 in such a manner as to cause the bus input logic 300 to generate an ENABLE signal 242 which sets a bistable 240 and causes the bistable 240 to generate a BDEN signal which places the microcomputer 202 into operation. As will be explained below, the microcomputer 202 then examines the contents of the single command 3006 location and takes whatever action the computer 102 has called for.

A number of command options are available. The simplest command that the processor 102 can place into the single command 3006 location is a segment address 3005. Upon receiving a segment address as a command, the microcomputer 202 causes the voice synthesizer 216 to generate the corresponding segment as speech.

If the command supplied is a number within the range of $0800 to $083F, the command informs the microcomputer 202 that a multiple series of commands have been placed in the multiple commands portion 3008 of the speech memory 214. The least significant six bits of the number supplied indicates how many commands have been placed in sequential memory locations $0002 through to the end of the multiple command set. The individual commands within this set may be segment address commands or silent interval commands or both.

If a command stored either in the single command region 3006 or multiple commands region 3008 falls within the numeric range $C000 to $FFFF, the command is a time delay command that orders the speech processor to do nothing for a predetermined number of 12.5 millisecond time internals specified by the least significant 14 bits of the command.

The computer 102 can, by proper manipulation of the peripheral connector 106 control signals, cause a STATUS signal 244 to be generated by the bus input logic 300 which causes status data presented at Port B of the microcomputer 202 to be gated through buffer 246 and presented to the data bus D0–D7 230 from which the status data may be read by the computer 102. This data can indicate, for example, whether the microcomputer 202 is busy generating speech or otherwise executing a series of commands. A special number presented to the computer 102 on some of the leads D0–D7 230 can identify the speech processor to assist the computer 102 when searching the peripheral connector 106 slots for the speech processor 200. Other status leads can indicate such things as the size of the speech memory, if it is variable in size.

Once placed into operation by the BDEN signal 241, the microcomputer 202 generates a LOAD signal 248 that resets the bistable 240, flows through the gate 206 to clear the counter 220, and flows to the LD (Load) input of the counter 218 thereby causing the counter 218 to load itself with the number 250 presented at Port A of the microcomputer 202. At this time, Port A presents $0000 to the counter 218. Accordingly, the two counters are cleared to zero count so they address the single command 3006 data in location $0000 of the memory 214.

Next, the microcomputer generates a NEXT signal 252 which the NEXT signal pulse generator 500 converts into a carefully synchronized NEXT PULSE 254. The NEXT PULSE flows into the timing logic 400 and initiates an RAS 236 and CAS 234 signal sequence that transfers the contents of location $Q000 within the speech memory into the latch 256 over the memory output bus 258 and that advances the counter 220 to a count of $0001 so the counters 218 and 220 now address location $0001.

The microprocessor then terminates the NEXT signal 252 and initiates an EN DATA signal 260 that displays the contents of the latch 256 to the bus 250 and to Port A of the microcomputer 202. The microcomputer then accepts the byte of data from the bus 250. Immediately thereafter, the microcomputer 202 again generates the NEXT and EN DATA signals in rapid sequence and thereby reads a second byte of data from location $0001 within the speech memory 214, leaving the counters 218 and 220 addressing memory location $0002.

The microprocessor 202 next examines the 16-bit command it has retrieved from the speech memory and takes whatever action is appropriate, as is explained more fully below. If the address counters 218 and 220 need to be reset to point to a specific address, the microcomputer 204 presents the most significant byte of the desired address to the counter 218 over the bus 250 extending from Port A, and then it generates the LOAD signal to clear the counter 220 and load the most significant byte of the address into counter 218. Then, if the least significant byte of the desired address is nonzero, the microcomputer 202 generates the NEXT signal 252 a number of times equal to the numeric value of the least significant byte. Since each NEXT signal causes the timing logic 400 to generate a CAS signal 234 which advances the counter 220, the net effect of these operations is to set the counters 218 and 220 to the desired address value. By then generating the NEXT signal 252 and the EN DATA signal 260 in alternate sequence, the microcomputer 202 can step through and examine the contents of the speech memory locations starting with the specified address.

The microcomputer 202 maintains its status at port B where it is available to the computer 102, including one data bit that indicates whether the microcomputer is "BUSY."

Since the speech memory 214 is dynamic, it must be "refreshed" periodically to keep it from losing data. At times when the speech processor 200 and computer 102 are otherwise not using the memory 214, a REFRESH signal 262 connects the address input of the speech memory 214 to an 8-bit counter 264 via the 2-1 select gate 210. A gate 263 is additionally enabled by the REFRESH signal 262 to pass the phase 0 signal 228 to the counter 264 such that it counts upwards continuously in synchronism with the 0 signal. The RAS signal 236 continuously pulses the memory 214 even in the absence of the CAS signal and thereby causes locations within the speech memory 214 to be addressed by the count output of the counter 264.

The RESET signal 266 from the computer 102 is applied to the microcomputer 202 and the next signal pulse generator to reset these devices whenever the computer 102 is reset. Further, a programmable reset from computer 102 is generated to microcomputer 202 by causing bus input logic 300 to produce a NMI signal 221. The signal 221 is applied to the NMI input of microcomputer 202 to generate a non maskable interrupt which transfers control of the program sequence to an interrupt handling routine which resets the device.

The Q3 signal 268 is an asymmetrical timing signal from the computer 102 that is fed into the microcomputer 202 to serve as a clock signal and to synchronize the operation of the computer 202 with the operation of the speech memory 214, which derives its timing from the phase 0 signal 228 in the computer 102. The timing relationship of the Q3 signal 268 and the phase 0 signal 228 is illustrated on page 91 of the "Apple II+ Reference Manual" book mentioned above. The Q3 signal fluctuates at precisely twice the frequency of the phase 0 signal, going high for 300 nanoseconds each half cycle the phase 0 signal. The Q3 signal is transmitted through a Schmidt trigger gate 233 having its other input connected to the positive logic voltage +. The gate 233 provides a hysteresis for the Q3 signal to square up that signal and eliminate any jitter or noise therein.

The Q3 signal 268 is applied to input pin 10 of the microcomputer 202, and the RESET signal 266 is applied to pin 39. The remaining four signals shown in FIG. 2 connect to bit positions in port C of the microprocessor 202 as follows:

| Signal Name | Ref. No. | Port C Bit Pos. |
|---|---|---|
| NEXT | 252 | 6 |
| EN DATA | 260 | 3 |
| LOAD | 248 | 1 |
| BDEN | 241 | 0 |

The remaining four Port C signals are connected to the voice synthesizer 216 by a bus 270, and are connected as follows:

| Signal Name | Port C Bit Pos. |
|---|---|
| RDY | 7 |
| INT | 6 |
| RS | 4 |
| WS | 2 |

Port D, bits 0-7, connect respectively to the speech synthesizer 216 input leads which Texas Instruments has labeled "D7" through "D0". This connection is established by a Bus 272. A 50 picofarad capacitor 274 connects the OSC lead of the synthesizer to ground, and 68,000 ohm resistor 276 and 50,000 ohm variable resistor 278 connect this same lead to a negative 5 volt supply 280 which also connects to the voice synthesizer. While the connections are not shown, all the logic elements in FIG. 2 connect to a positive 5 volt supply and to ground.

The Bus Input Logic 300

FIG. 3 contains the logic that decodes the signals presented by the peripheral connector 106 and generates the control signals that establish communication between the computer 102 and the speech processor 200.

The signals shown in the lower half of the figure do not require decoding. Only the phase 0 timing signal 228 is passed through a Schmidt trigger gate 310 so that the peripheral connector is not unduly loaded and so that the signal has the jitter and noise removed from it by the hysteresis of the gate.

Peripheral connector 106 address leads A7 through A15 are decoded by gates 304, 306, and 308 such that a signal C08X 312 appears whenever the binary address "1100 0000 1xxx xxxx" (where x may be "0" or "1") is applied to the peripheral connector address leads. With reference to FIG. 4, the signal C08X 312 passes through gates 401, 404 and becomes the REFRESH signal 262 that causes the 2-1 select 210 to disconnect the refresh 8-bit counter 264 from the speech memory 214 and connect the gate 210 instead to the counters 218 and 220 whenever the computer 102 may be attempting to feed data into the speech memory 214. The REFRESH signal 262 has the jitter and noise removed from it by passing the signal through the gate 404 which is a Schmidt trigger gate.

The peripheral connector DEVICE SELECT signal, which selects a peripheral port whenever the computer 102 addresses locations between $C0N0 and $C0NF (where N is the peripheral connector port number), enables a 3 to 8 line decoder 302 to decode address lines A0, A1, A2, and A3 into the four control signals WOM 282 (generated by address $CON0), COUNT 0 217 (generated by address $CON1), SETNMI 219 (generated by address $CON2), and ENABLE 242 (generated by address $CON3). The SETNMI signal 219 sets a flip-flop comprising cross connected NAND gates 301, 303. When the flip-flop is set, it generates the NMI signal 221 to the microcomputer 202. The flip-flop is reset when the computer 102 causes the generation of the count 0 signal 217.

Timing Logic 400

With reference to FIGS. 4 and 9, the speech system 200 timing signals that govern the operation of the speech memory 214 are generated by the timing logic 400. The phase 0 timing signal 228 from the computer 102 is fed through a series of three inverting time delay networks 406, 408, and 410. The first inverting time delay network 406 feeds the phase 0 signal 228 through 1,000 ohm resistor 412 and a 180 picofarad capacitor 414 to ground. The delayed phase 0 pulse at the node 416, where elements 412 and 414 join, is inverted and squared up by passage through a gate 418 to become a PHASE 1 signal 420, as shown in FIG. 9. In a similar manner, the PHASE 1 signal 420 is fed through inverting time delay networks 408 and 410 to become the PHASE 2 signal 422 and the PHASE 3 signal 424 whose timing relationships to the PHASE 1 signal 420 is shown in FIG. 9. The network 408 includes a 1,000 ohm resistor 426 and a 150 picofarad capacitor 428, while the network 410 includes a 1,000 ohm resistor 430 and a 100 picofarad capacitor 432.

With reference to FIG. 2, the phase 0 signal 228 controls the 2-1 select 212 that alternately couples the counters 218 and 220 to the speech memory 214 address input. When the phase 0 signal 228 is low, a RAS signal 236 pulse loads one of the two counter's address signals into the memory 214. When the phase 0 signal 228 is high, a CAS signal 234 pulse loads the other counter's address signals into the memory 214. The CAS signal 234 then advances the counter 220 so that the next sequential location in the memory 214 is addressed during the next phase 0 timing cycle.

Of course, the above sequence of operations assumes that either the computer 102 or the microprocessor 202 is accessing the memory 214, so that its address signals are derived from the counters 218 and 220 and the CAS signal 234 is generated. At other times, the CAS signal does not arise, and the RAS signal actuates the memory 214 to accept addresses from the refresh counter 264.

Referring once again to FIGS. 4 and 9, the RAS signal 236 is formed by passing both the phase 0 and PHASE 1 signals through a gate 434 at whose output a signal appears whenever either of these two signals is present. The absence of an output from the gate 434 is defined to be the presence of the inverted RAS signal 236 which goes high momentarily whenever the phase 0 signal goes low and then drops when the PHASE 1 signal goes high.

The gate 436 prevents the CAS signal 234 from arising except when the phase 0 and PHASE 2 signals are both high. Accordingly, the CAS signal can only arise towards the middle of the period when the phase 0 signal is high, and the CAS signal terminates (and advances the counter 220 in FIG. 2) in synchronism with the termination of the phase 0 signal 228. The CAS signal arises from either the WOM signal 282 or the NEXT PULSE signal 254 flowing through the combining gate 440 and the blocking gate 436, and these respectively arise when the computer 102 (which generates the WOM signal) or the microcomputer 202 (which generates the NEXT PULSE signal) attempt to access the speech memory 214.

The R/W signal 284 from the peripheral connector, which distinguishes a data read request from a data write request, is passed through a blocking gate 402 to become the WRITE signal 232 that enables the speech memory 214 to accept new data. The timing of the WRITE signal 232 is adjusted so that it is, in effect, a CAS signal whose onset is delayed slightly to coincide with the time when the computer 102 presents data to the data bus D0-D7 230. The CAS signal 234 is passed through a gate 440 that is disabled at the onset of the CAS signal by the delayed onset of the PHASE 3 signal 424. The delayed-onset CAS signal 442 that flows from the gate 440 is fed into the gate 402 to determine the timing of the WRITE signal. The gate 402 blocks the signal R/W from becoming the WRITE signal 232 whenever the NEXT PULSE signal 254 signals that the microprocessor 202 is reading data out of the memory. The gate 402 also blocks the signal R/W whenever the WOM signal 282 is absent, since memory WRITE cycles are signaled by the WOM signal 282.

A NAND gate 403 generates the READ signal 237 from a combination of the WOM signal 282 and the R/W signal 284 received at its inputs. A data read request, R/W signal high, is transmitted by the gate 403 to become the READ signal 237 in the absence of a WOM signal 282. This logic combination prevents a read and write request from occurring simultaneously.

Next Signal Pulse Generator 500

The NEXT signal 252 generated by the microprocessor must be converted into a carefully timed NEXT PULSE 254 (FIGS. 2, 5 and 9), and this conversion is carried out by the pulse generator 500. The NEXT signal 252 leading edge sets a JK master-slave flip flop 502 whose Q output 506 enables the J input of a second JK master-slave flip flop 504. The next trailing edge of a phase 0 signal 228 toggles the flip flop 504, and it initiates the NEXT PULSE signal at 254. One phase 0 cycle later, the NEXT trailing edge of a Phase O signal 228 clears the flip flop 504 and terminates the NEXT PULSE signal 254. A 510 picofarad capacitor 508 feeds the trailing edge of the NEXT PULSE signal 254 back to the inverted clear terminal of the flip-flop 502 which is connected to ground and +5 volts by a pair of 1,000 ohm resistors 510 and 512. The circuit thereby resets itself and awaits the next NEXT signal 252.

Audio System 600

Figure 6:
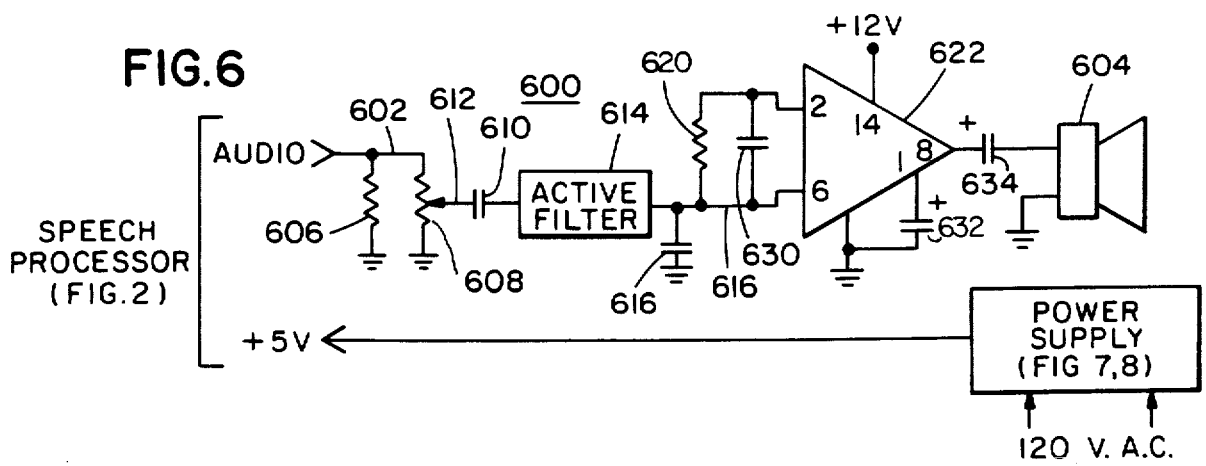
FIG. 6 is a partly block and partly circuit diagram of an audio system 600 that forms an element of the computer system 100.

The audio system 600 illustrated in FIG. 6, is a conventional audio amplifier that accepts the AUDIO signal 602, adjusts its level, filters it, amplifies it, and applies it to a loudspeaker 604.

While the preferred embodiment of the invention has been described, it will be understood by those skilled in the art that numerous modifications and changes can be made without departing from the spirit of the invention. The claims that follow are intended to define the true spirit and scope of the invention.

The AUDIO signal 602 is first applied across 1,000 ohm resistor 606 and a 10,000 ohm potentiometer 608 connected in parallel to ground. A 0.1 microfarad capacitor 610 connects the slider 612 of the potentiometer 608 to a 4-pole active filter 614 having a 4,000 Hz low-pass cutoff characteristic. The filter 614 connects to the input lead 6 of an integrated circuit audio amplifier 622. A feed back network comprising a 100,000 ohm resistor 602 connected in parallel with a 501 picofarad capacitor 630 connect pins 2 and 6 of the amplifier 622 together. Pin 1 is connected to ground by a 5 microfarad capacitor 632, and a 100 microfarad capacitor 634 connects the amplifier 622 output pin 8 to the speaker 604 which has its other lead connected to ground. The amplifier 622 is a National Semiconductor No. LM380 audio amplifier.

Twelve volts of power for the audio amplifier 622 is provided at pin 2 by a 12 volt D.C. power supply 700 shown in FIG. 7 connected by a fuse 702 and an "off-on" switch 704 to a 120 volt source of A.C. power 706. The power supply 700 is conventional. Optionally, the +12 volt power supply 700 can power a regulated at +5 volt power supply 800 shown in FIG. 8 which can feed at +5 volt power back to the speech processor 200 (FIG. 2) to reduce or eliminate the drain on the power supply of the computer 102. The regulated at +5 volt power supply is conventional.

Description of the Programmed Portions of the System Processor Control Program 204

In FIG. 2, the microcomputer 202 as shown contains a processor control program 204 which controls its operations. FIGS. 22 to 29 constitute a complete flow diagram of the program logic of the control program 204. These flow diagrams are explained below.

The SCAN Routine

With reference to FIG. 22, after performing certain housekeeping functions at 2202 to initialize the speech processor 200, program execution commences at SCAN and thereafter periodically returns to SCAN when all other tasks are finished.

The microcomputer begins at 2204 by generating a momentary LOAD signal 248 to reset the bistable 240 and load or clear the speech memory address counters 218 and 220. The microcomputer then clears the "busy" bit of its status work at Port B and enters into a loop at 2208 and 2210 where it repeatedly tests for the presence of a BDEN signal 241, indicating the computer 102 has set the bistable 240 and wishes some task performed.

At 2212 the microcomputer sets the port B "busy" bit, and at 2214 it fetches the two byte command from addresses $0000 and $0001 of the speech memory 214. If the command is a number less than or equal to $25F, it is a phase segment address—a simple request to have a particular speech segment reproduced. Detecting this at 2216, the microcomputer stores zero in location PHRASE to indicate the phase segment address is stored in speech memory location $0000, and it stores a 1 in location PHRASE S, since this is the number of phrases to be reproduced. Program control then continues at SPEECH in FIG. 20.

If it is not a segment address, the microcomputer checks at 2220 for a request to process a multiple set of commands. The most significant byte of such a command is $80, and the least significant byte is the number of commands (presumably stored sequentially in speech memory locations $0002, $0004, etc.) that are to be executed, up to a maximum of $3F commands. If this is a multiple command processing request, the microcomputer stores the six least significant bits of the command (representing the number of commands to be executed) in location PHRASES and stores a 1 in the location PHRASE to indicate the first command to be executed is in the second 16-bit location of the speech memory (e.g., locations $002 and $0003). Then program control continues at SPEECH in FIG. 23.

If the command being decoded is not a multiple command request, the microcomputer checks 2224 to see if the two most significant bits are set, indicating this is a time delay or pause request, with the remaining bits indicating the length of the pause measured in 12.5 millisecond intervals. If so, the subroutine DODELAY in FIG. 26 is called at 2226. If not, then an error action is taken at 2228. In either case, program control returns to SCAN where the bistable 240 is cleared and the "busy" bits is also cleared and the microprocessor idles once more awaiting the next ENABLE command 242 from the computer 102.

The Speech Routine

Figure 23:
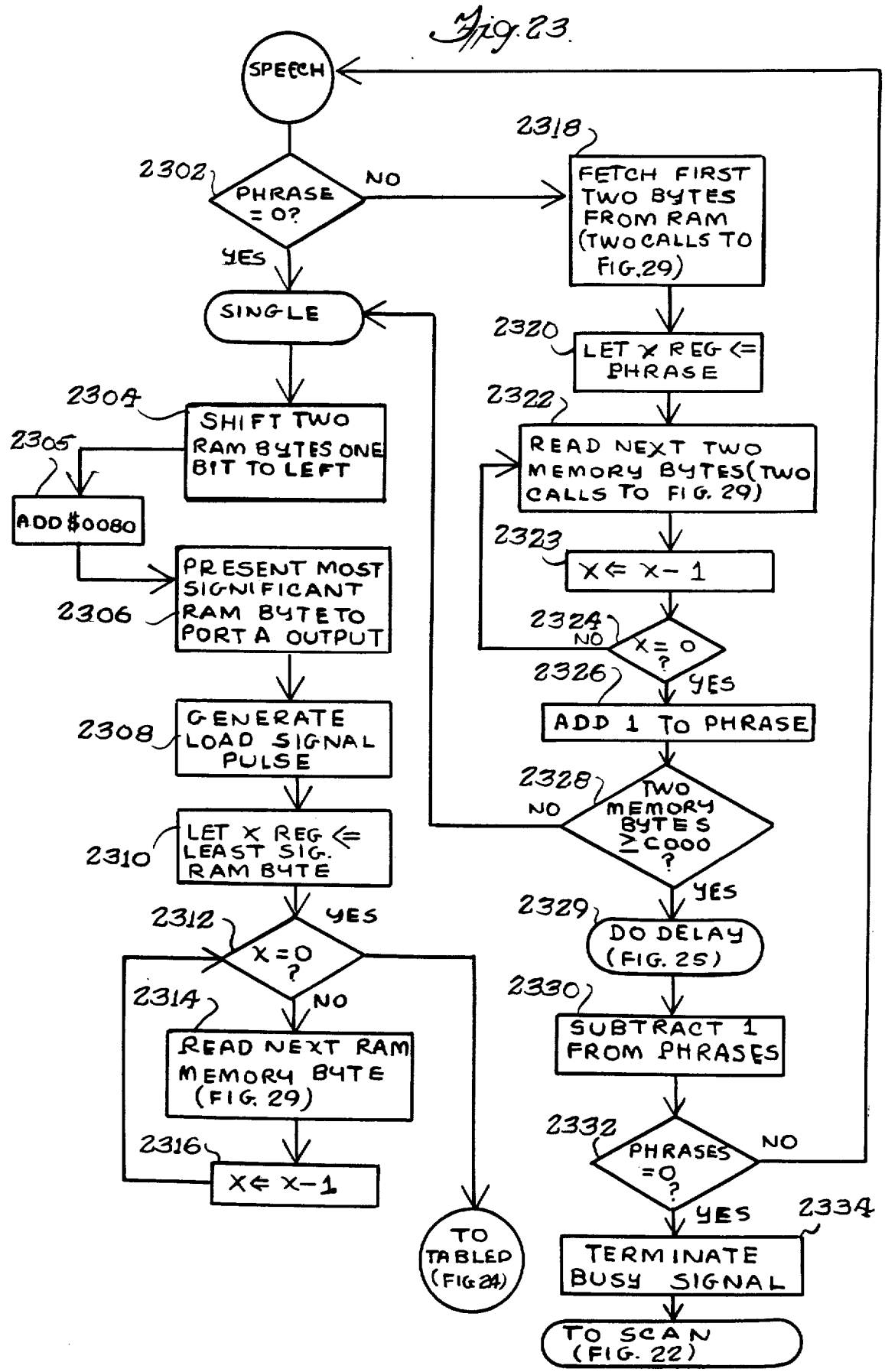
FIG. 23 is a flow diagram of the SPEECH portion of the processor control program 204.

With reference to FIG. 23, the routine SPEECH begins at 2302 by checking to see if a multiple command sequence is being processed. If so, then program control shifts to 2318. The memory address counter is cleared to zero by accessing the first two bytes of data the speech memory. Then the desired phrase number (the number of the 16-bit location where the next command to be executed is stored) is placed in index register X at 2320. A loop is then entered during each pass of which the next two speech memory bytes are read and index register X is decremented, with the loop (steps 2322, 2323, and 2324) terminating at 2324 when the contents of the index register X equals 0 and the next command to be executed has been retrieved. "1" is then added to the number in PHRASE so that the next command in the speech memory will be selected the next time.

At 2328, the command just retrieved is tested to see if it is a segment address (less than $C000). If it is, program control continues at SINGLE where single segment address commands are also processed. If a time delay request, the subroutine DODELAY is called at 2329 to process the request. One is subtracted from the remaining-to-be-executed command count in location PHRASES (at 2330), and PHRASES is checked to see if it equals zero. If not, program control branches back to SPEECH, and the next command is executed. If no more commands remain the "busy" bit is cleared at 2334, and program control returns to SCAN in FIG. 22 where the microcomputer 202 idles once again.

The SINGLE Routine

If a segment address is to be processed, program control continues at SINGLE with step 2304. First, the segment address is shifted and thereby multiplied by two to convert it into a relative byte address. Then $0080, the base address of the speech data vectors storage area (3004 in FIG. 30), is added to the relative address to produce the two byte absolute address of the two locations containing the starting address of the segment of speech data. At 2306, the most significant address byte is presented to microcomputer Port A for presentation to address counter 218, and at 2308 a LOAD signal is generated to load this byte into counter 218 and to zero counter 220. Now the least significant address byte is placed in index register X, and a loop (2312, 2314, 2316) is entered into during which NEXT signal pulses are generated to increment the counter 220, while the index register X is decremented, until register X contains zero and counter 220 now contains a count value equal to the least significant address byte.

Figure 24:
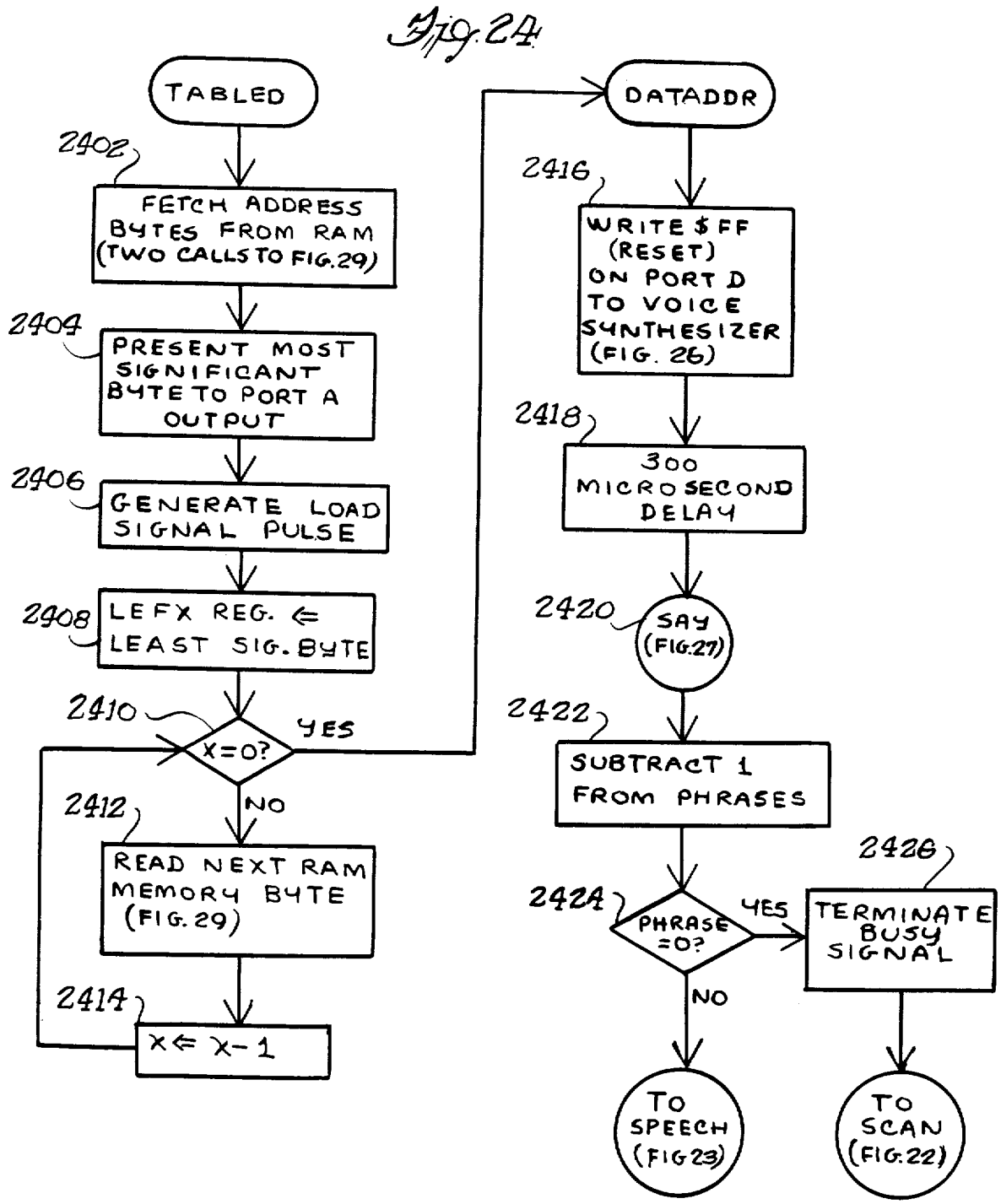
FIG. 24 is a flow diagram of the TABLED portion of the processor control program 204.

Program control continues at TABLED in FIG. 24 where the vector address is retrieved by the generation of two NEXT pulses (step 2402). Now the two bytes are the most and least significant bytes of the actual starting address of the locations containing the speech data. Steps 2404, 2406, 2408, 2410, 2412, and 2414 are now executed in a manner virtually identical to steps 2306 to 2316 just described in the last paragraph, leaving the counters 218 and 220 containing the actual starting address of the speech data when program control continues at DATADDR.

At DATADDR, the microprocessor begins transferring the speech data to the voice synthesizer 216. At 2416, the value $FF is presented to the synthesizer over Port D. Then a 300 microsecond delay is generated at 2418. At 2420, the subroutine SAY (FIG. 27) is called upon to transfer the speech data to the synthesizer. Then, at 2422, 1 is subtracted from the number of phrases or commands waiting to be processed. If more remain (2424), then program control returns to SPEECH in FIG. 23, and the next command is processed. If none remain, step 2426 clears the BUSY bit, and program control returns to SCAN in FIG. 22 where the microcomputer idles once again.

Subroutine DODELAY

The subroutine DODELAY in FIG. 25 causes the speech processor to idle for the number of 12.5 millisecond time intervals indicated by the 14 least significant bytes of the delay command. At 2502, the eight least significant bits are entered into the microprocessor's accumulator, and then a loop (2504, 2506, 2508) is entered. Within this loop, the accumulator is decremented every 12.5 milliseconds until it equals zero. Next, the least significant bits of the most significant byte are stored in location ADDR0. A loop is then entered (2512, 2514, 2516). Within this loop, the number in location ADDR0 is decremented every 3.2 seconds until it becomes zero.

Subroutine SAY

FIG. 27 presents the subroutine SAY that transfers data from the speech memory 214 to the voice synthesizer 216 until an entire phrase has been transferred. A loop (2702, 2704, 2706) is entered into during which the synthesizer status bits are retrieved and the talk status bit is checked over and over until it is cleared. At step 2708, a command, $06 is presented to the synthesizer over Port D of the microprocessor. After a 42 microsecond delay (2710), a byte of data is transferred from the speech memory 214 to the voice synthesizer 216 (steps 2712 and 2714). Program control then continues at REFILL.

AT 2716, the value "8" is placed into the index register X to serve as a loop counter. Then a loop is entered into (2718, 2720, 2722, 2724). During eight passes through this loop, eight bytes of data are transferred between the speech memory 214 and the voice synthesizer 216. Index register X is decremented during each pass, and when X contains zero, program control loops at 2726 and 2728 until the INT signal line from the speech processor goes high. Then at 2730 the synthesizer status bits are retrieved and checked. If they equal "6", then program control returns to REFILL, and another 8 bytes of data are transferred. If they equal "4", the loop at 2726 and 2728 is commenced until the next interrupt. If they equal zero, then the speech segment data transfer is done. Any other result causes an error return from the subroutine. The value tests are carried out at 2732, 2734, and 2736.

Subroutine WRITE

The subroutine WRITE in FIG. 26 is called upon by the subroutine SAY in FIG. 27 to transfer a byte of data from the microprocessor 202 to the speech synthesizer 216. Since the data to be transferred is passed to the subroutine in the accumulator, its contents are presented to Port D, the data lines leading to the synthesizer (step 2602).

The number $FB is applied to port C to send a W signal to the synthesizer, signaling the data is read (step 2604). A loop is then entered at 2606–2608 that samples the synthesizer RDY signal until it drops. Then $FF is applied to Port C to terminate the WS signal (2610).

Subroutine STATUS

The STATUS subroutine in FIG. 28 returns in the accumulator three status bits obtained from the synthesizer. At 2802, the number $FF is presented at Port D to the synthesizer data lines. Next at 2804, the value $EF is presented at port C to generate the Synthesizer RS (read select) input signal. At 2806–2808, the system loops while continuously checking the "RDY" signal bit which is the most significant port C bit. When it goes low, synthesizer status data is read from port D into index register X (2810). $FF is presented to port C to terminate the RS signal (2812). The status data is transferred to the accumulator (2814), right shifted until bits 5, 6 and 7 are bits 0, 1, and 2 (2816), and masked 2818.

Subroutine READMEM

This frequently-called-upon subroutine (FIG. 29) reads a byte of data from the speech memory 214 and increments the counters 218 and 220. It begins at 2902 by generating the NEXT signal 252 by presenting the number $DF to Port C. At 2904, it terminates the NEXT signal 252 and simultaneously generates an EN DATA signal 260 by presenting the number $F7 to port C. Next at 2906, the microprocessor reads in the byte of memory data presented to port A by the enabled latch 256. Finally at 2908, all signals are terminated by presenting $FF to port C.

Speech Control Program 104

The speech control program 104 is a program within the computer 102 that calls upon the speech processor 200 to generate individual and sets of speech segments and time delays. Clearly, the present invention contemplates the development of many different types of speech control programs, including, for example, computer-aided-instructional programs that do many things in addition to and, perhaps, simultaneously with the generation of speech. All such programs will include program elements that can pass data and commands over the peripheral connector 106 to the speech processor 200 and test the status of the processor 200, particularly whether it is busy. So the speech control program described below is simply one example of how the speech processor 200 can be used in conjunction with the computer 102. The example chosen is a test program used by the developers of this system to emulate the operation of the speech processor 200 by computer-aided-instructional (CAI) programs. Only instead of having actual CAI programs passing commands to the speech processor, the emulation program described below permits a human to type out the number of the command or commands that are to be executed. This emulation program contains all of the "hooks" that any program would need to function as the speech control program element of the present invention, so it serves to illustrate the present invention quite nicely. It is also a relatively simple program.

Main Program Routine

Figure 10:
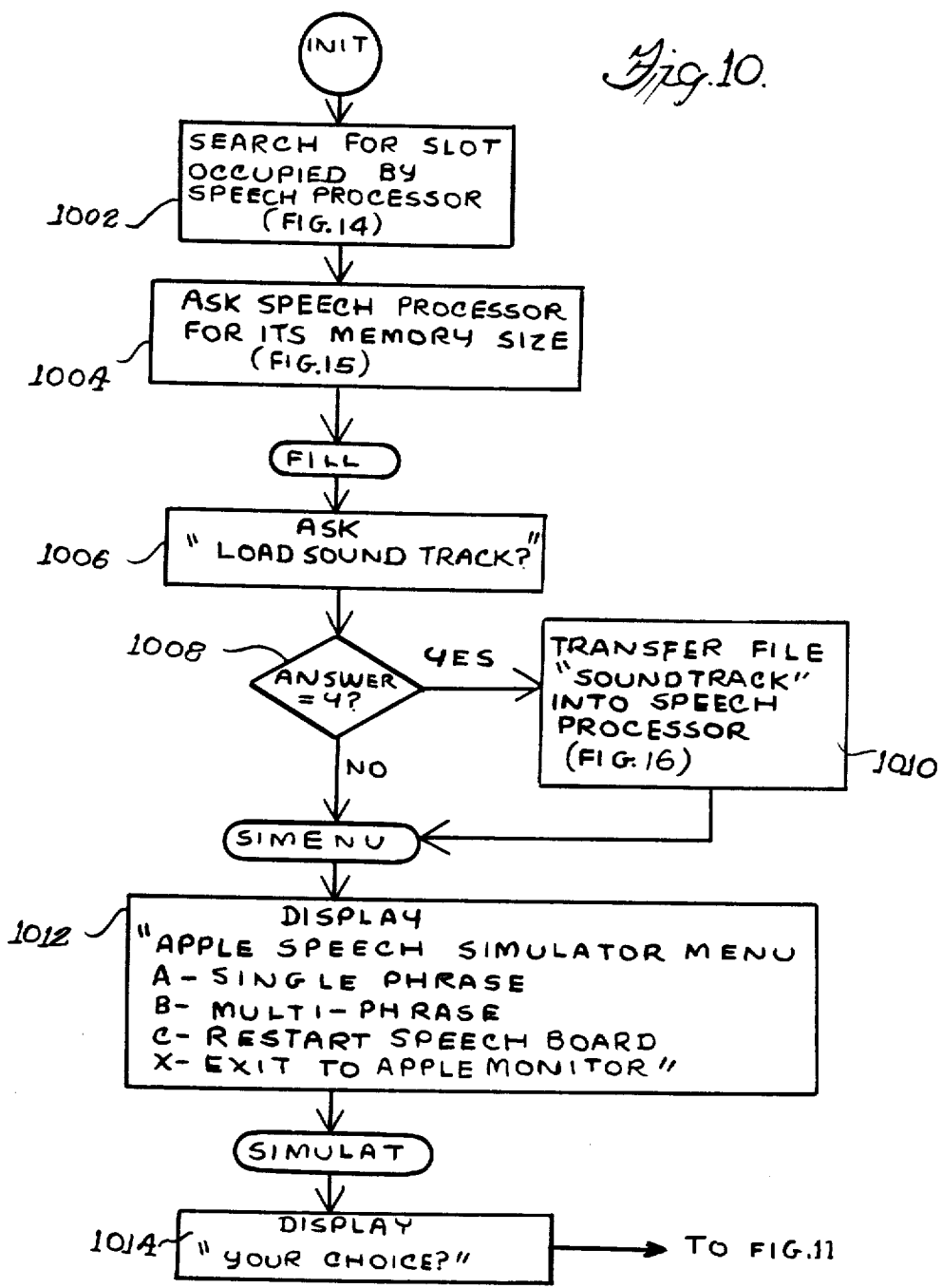
FIGS. 10 and 11 together form a flow diagram of the first half of the main part of the speech control program 104 which controls the programmable digital computer 102 of the digital speech system 100.
Figure 11:
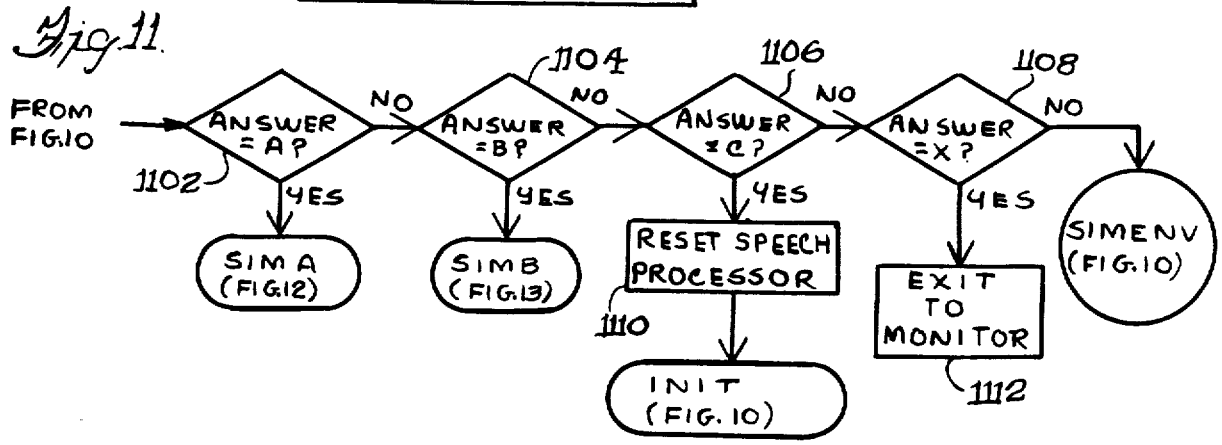

FIGS. 10 and 11 together illustrate the main flow of the speech control program 104. After initializing the system by seeking out the slot in the peripheral connector 106 where the speech processor 200 is stored (at 1002) and determining the size of the speech memory 214, (at 1004) the program at 1006 asks if you wish to have the "soundtrack" or sound data set loaded. If you do, the program at 1010 transfers the sound data set from disk storage into the computer 102 memory and from there into the memory 214, assumedly filling locations $0080 to the end of the memory 3002 or some point short of the end of the memory (See FIG. 30). A frequently used multiple command sequence might be loaded into area 3008 at the same time.

The program at 1012 and 1014 now asks you what you wish to do next. Your answer is analyzed at 1102-1108 in FIG. 11. If you type A, indicating you wish to issue a single command, at 1102, you are routed to the SIMA routine in FIG. 12. If you typed B and thereby select a multiple command set, at 1104 you are routed to SIMB in FIG. 13. If you type C, the speech processor is reset at 1110, and program control returns to the very beginning with the reinitialization of everything at INIT in FIG. 10. If you type X, the program at 1108 returns you to the Apple monitor at 1112. Any other response simply returns program control to SIMENU in FIG. 10 where the same question is repeated.

SIMA Routine

Figure 12:
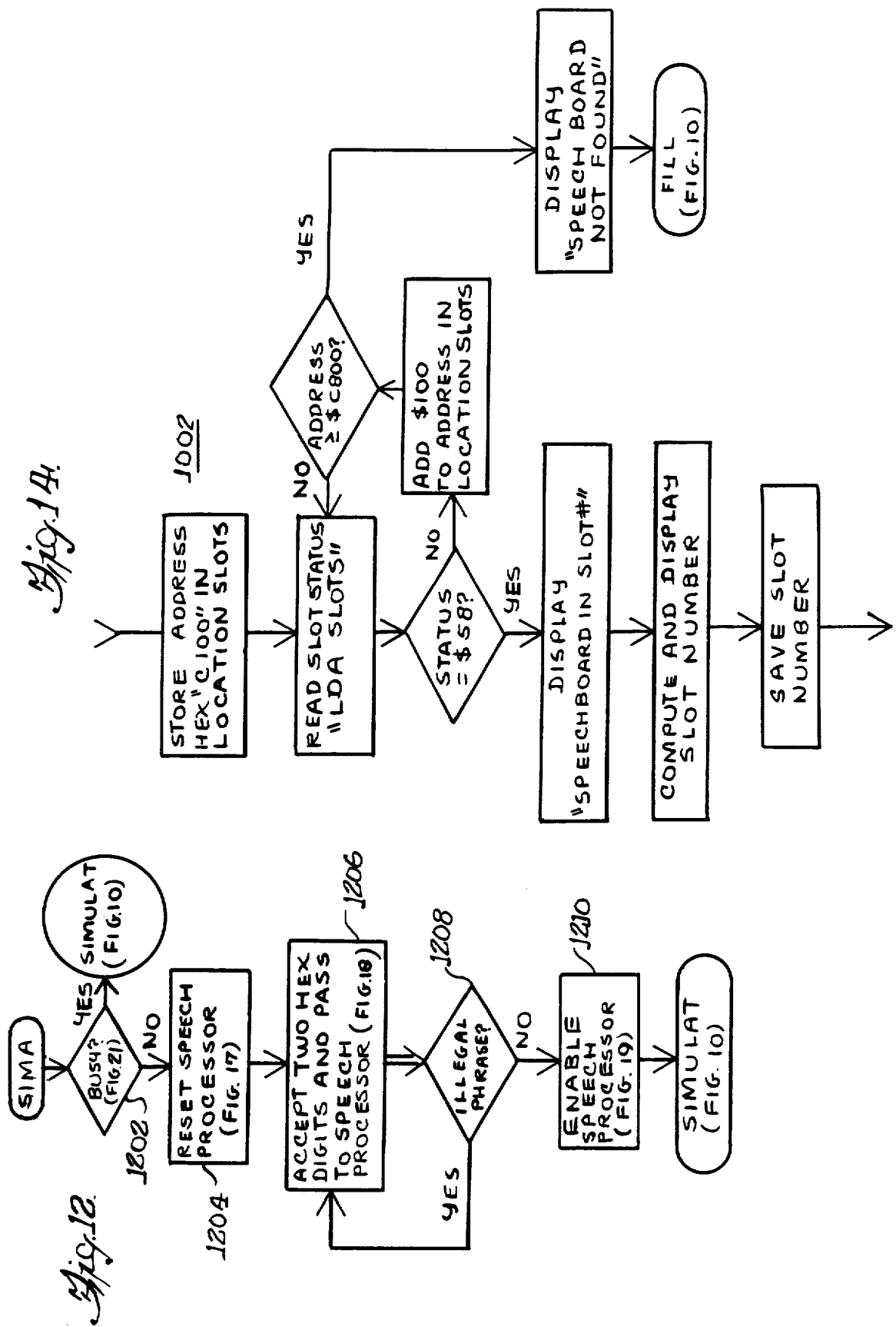
FIG. 12 is a flow diagram of the SIMA portion of the speech control program 104.

FIG. 12 presents the program that lets you simulate the passing of single commands to the speech processor 200. At 1202, the status of the speech processor 200 is checked. If the "busy" bit is set, program control returns to the prompting point SIMULAT in FIG. 10. Otherwise, the speech processor is reset at 1204. Two hexadecimal digits are solicited at 1206 and checked for illegality at 1208. If illegal, they are rejected, and two more digits are requested. Then at 1210 the speech processor is placed into service. Program control then returns to the prompting point SIMULAT in FIG. 10.

SIMB Routine

This is the routine that permits you to supply multiple commands to the speech processor 200. It begins at 1302 by checking to see if the speech processor is in use. If not, at 1304 it asks you how many commands (phrases to be spoken and time delays) you wish to submit. The speech processor address counters are then reset to zero at 1306, and $80 is poked into speech memory 214 location $0000 at 1308. At 1310 your answer is accepted and tested at 1312 and 1314 to make sure it falls within the range of 1 to 63 commands.

At 1316, the number of commands is stored in location $0001 of the speech memory 214. Next, a loop encompassing steps 1318, 1320, 1322, and 1324 is entered. During each pass, two phrase or time delay hexadecimal digits are solicited, accepted, checked for errors, and stored in sequentially adjacent locations in the speech memory 214 beginning with location $0002. This process continues until an error transfers program control back to SIMB or until the proper number of phrases and time delays have been provided. Then the speech processor is placed in operation at 1326, and program control returns to the SIMULAT reprompting entry point in FIG. 10.

Miscellaneous Routines

FIGS. 14-16 and 19 disclose some of the more detailed aspects of the interaction between programs in the computer 102 and the speech processor 200.

FIG. 14 describes a routine 1002 that searches for a peripheral connector 106 slot address from which the speech processor 200's indentifying code $5B can be retrieved. This routine 1002 is part of the initialization routine INIT at the top of FIG. 10.

FIG. 15 describes a routine used to inquire of the speech processor's status bits as to how large a memory the speech processor has. After initializing the processor at 1502, setting its counters to zero count, this routine stores the special command $FF00 in the processor (Note: the speech processor routine that responds to this special command is not disclosed in this application which assumes a fixed sized memory). Note that the bytes $FF and $00 are simply stored in computer 102's memory location "$CO80+$10 (Slot)" which means in location $CO90 if the processor is in slot 1, and so on. The speech processor is then enabled at 1506, and a 255 millisecond timer is established at 1508. A loop (1510, 1512, 1516) is then entered. During each pass, this loop uses the machine language addressing scheme indicated at 1510 to transfer status data from the microcomputer 202, through the latch 246, and into the accumulator of computer 102. When bit 4 (the "busy" bit) changes at (1512, the status data is accepted. Bits 1 and 2 indicate memory size at 1514. If the speech processor remains busy for too long, step 1516 routes program control to an error routine 1518.

FIG. 16 illustrates the details of transferring speech data from a disk file into the speech memory 214. The file "soundtrack" is first transferred from a disk file into computer memory at 1602. Then, one byte at a time, the data is presented to the memory location whose address is computed as shown at 1604.

FIG. 17 illustrates how the speech processor can be reset. The slot number (of the peripheral connector slot where the speech processor 200 resides) is placed in index registry Y and is thereby added to the base address $CO81 to produce the proper address. The "1" least significant digit energizes the B input of the 3 to 8 line decoder 302 (FIG. 3) and causes the COUNT O signal 217 to reset the counters 218 and 220 (FIG. 2) to zero.

FIG. 19 is similar to FIG. 17 but illustrates how the speech processor is placed into operation by addressing the base address $CO83 instead of $CO81. The "3" actuates inputs A and B and therefore actuates output 3 of the 3 to 8 line decoder 302 (FIG. 3) which is the ENABLE signal 1242 that sets the bistable 240 and places the speech processor 200 into operation.

SAYTHIS Subroutine

The subroutine SAYTHIS (FIG. 18) is used by both the routines SIMA (FIG. 12) and SIMB (FIG. 13) to solicit hexadecimal digits, check them for errors, pack pairs of them into bytes, and feed the bytes to the speech processor 200. After prompting for two hexadecimal digits at 1802, the PACK subroutine accepts the digits, checks them for errors, and forms a byte from them. Steps 1806 and 1808 check to insure the digits are valid speech or delay commands. Then at 1810 the first byte of the command is fed into the speech memory 214. Then PACK solicits two more hexadecimal digits at 1812, and these are transferred to the memory 214.

PACK Subroutine

This subroutine PACK (FIG. 20) simply accepts two ASCII keystrokes, converts them to hexadecimal, error checks them, and packs them into a byte.

BUSY Subroutine

This subroutine (FIG. 21) determines the busy status of the speech processor 200 by loading the accumulator from the address indicated at 2110 and selecting the fourth bit to test 2112 and 2114. The carry flag is used as a return argument at 2116 and 2120. If the processor 200 is busy, the message at 2118 is displayed.

Detailed Program Listings

The following program listings were used to develop the computer programs that are to be found in the preferred embodiment of the invention.

The first set of programs are designed for installation in an Apple II+ microcomputer and for use in conjunction with that computer. A complete technical description of the Apple II+ computer, as well as a description of the mnemonic instruction language used below, can be found in the book entitled "Apple II Reference Manual" published in 1979 by Apple Computer, Incorporated. Pages 118 to 128 of that book introduce the 6502 microprocessor instruction set which is used in the programs that follow. Further information can be found in the book "Programming the 6502" written by Rodney Zaks and published by Sybex Incorporated, Berkeley, California. The Apple II+ peripheral connector bus and all of its signals, including those shown in FIG. 3, is described on pages 106 to 109 of the "Apple II Reference Manual," and the timing of these signals is indicated on page 91 of that book.

The second set of programs are designed for installation in the read-only-memory portion of an R6500/1 microcomputer system that forms a portion of the speech processor. This system is described in document No. 29650 N48 published in June of 1979 by Rockwell International Corporation, a manufacturer of this system (the document is entitled: "R6500 Microcomputer System Product Description: R6500/1 One-Chip Microcomputer."). The mnemonic instruction language for the R6500/1 is identical to that for the 6502 processor used in the Apple II+, so no separate reference book on the R6500/1 is required to understand the second set of programs. The R6500/1 contains 64 bytes of RAM positioned at memory addresses $0 to $03F and 2K of ROM positioned at $800 to $FFF. All variables are stored in RAM and all programs are stored in ROM. Its four external ports A, B, C and D are located at addresses $80, $81, $82 and $83, respectively.

Speech Control Program Listing

The following is an actual program used to program the computer to operate the speech processor, maintenance and diagnostic routines and other material not essential to a full understanding of the present invention have been omitted to keep the listing as simple and understandable as possible.

FIGS. 10 through 21 of the drawings constitute a complete, detailed flow diagram of the programs that follow Program address and subroutine names are the same in both the flow diagram and in the programs that follow. The main program is set out first, and it is followed by the subroutines which are arranged in alphabetical order.

Certain locations within the address space of the computer enable one to access the peripheral connector bus and to communicate over the bus with the speech processor. Those locations are assigned symbolic addresses which are indicated on the first page of the program listing that follows. The location SLOT contains the slot number where the speech processor is located within the computer, and this slot number is frequently used in computing the addresses which are assigned to the various symbolic names.

```
*
*
*   PAGE ZERO VARIABLES
*
*
OFF         EQU     $F9         OFFSET TO ESCAPE APPLE OS
PHRASES     EQU     6           PHRASE #
SLOT        EQU     7           SLOT # OF SPEECH BOARD (00-70)
BITS        EQU     8           BIT WIDTH OF MEMORY (0-3)
LIMIT       EQU     9           MEMORY LIMIT: 00-8, 40-4, 80-2
TEMP        EQU     10          TEMPORARY USE
MEMORY      EQU     11          CARD POINTER: $C080 + $10 (SLOT)
STATUS      EQU     13          STATUS POINTER: $C000 + $100(SLOT)
*
TEXT        EQU     0+OFF       TEXT ADDRESS
ASCII       EQU     2+OFF       ERROR ASCII DATA
CHAR        EQU     3+OFF       TEMP
ADDR        EQU     4+OFF       DEBUG USE
COMMAND     EQU     6+OFF       CURRENT DIAGNOSIC COMMAND
*
*
*   ASSEMBLER CONSTANTS
*
*
KEYDATA     EQU     $C000       KEYBOARD DATA
CLRKEY      EQU     $C010       ACCESS CLEARS KEY FLAG
MEMORG      EQU     $8000
*
*
*   I/O PORT ASSIGNMENTS
*
*
*
*   MEMORY = SPEECH BOARD WRITE MEMORY = $C080 + $10(SLOT)
RESET0      EQU     $C081       RESET ADDRESS COUNTERS
RESET       EQU     $C082       RESET SPEECH BOARD ( NMI/)
*   STATUS = R6500 STATUS OUTPUT = $C000 + $100(SLOT)
*
```

| BUSY | 1 | 0 | 1 | 1 | VALID | B1 | B2 |
|------|---|---|---|---|-------|----|----|
| BIT 7 | 6 | 5 | 4 | 3 | 2 | 1 | 0 |

| MEMORY BIT WIDTH: | | VALID | B1 | B2 | MODE | MEMORY SIZE |
|---|---|---|---|---|---|---|
| | | 0 | X | X | INVALID | |
| INIT: | 5B | 1 | 0 | 0 | 2 BITS | 16K |
| BITS: | 58+N | 1 | 0 | 1 | 4 BITS | 32K |
| TALK: | D8+N | 1 | 1 | 0 | 6 BITS | 48K |
| DONE | 58+N | 1 | 1 | 1 | 8 BITS | 64K |

```
ENABLE      EQU     $C083       ENABLE SIGNAL TO R6500
PRE64       EQU     $C088       PRESET / DATA PORT
STAT65      EQU     $C08A       STATUS
D5220       $C08C   5220
MASTER      EQU     $C08E       MASTER CONTROL PIA
*
*
*   SUBROUTINE LINKAGES
*
RDKEY       EQU     $FD0C       READ KEYBOARD = A.
COUT        EQU     $FDED       DISPLAY A
PRBYTE      EQU     $FDDA       PRINT A AS 2 ASCII CHAR.
*
            ORG     MEMORG
*
            JMP     INIT
```

-continued

| | | |
|---|---|---|
| JMP | SIMENU | |
| JMP | BITSIZE | |

The "SUBROUTINE LINKAGES" listed above are linkages to external subroutine utilities which form a part of the operating system of the computer and which facilitate single byte communication between the programs and the user sitting before the keyboard and display.

The following program initializes the computer, searching the accessory slots for the speech processor.

```
*
INIT      NOP
*
*    FIND WHICH SLOT WE ARE USING
*
          CLD
          LDX   #$C1              SLOT 1
SLOTS     LDA   $C100             READ 'STATUS' IN SLOTS
          CMP   #$5B              PROPER RESET STATUS
          BEQ   SLOTTED
          INX
          STX   SLOTS+2           INCREMENT READ ADDRESS
          CPX   #$C8              PAST LAST SLOT
          BCC   SLOTS             KEEP SEARCHING
*
*    SPEECH BOARD NOT IN ANY SLOT
*
          JSR   DOTEXT
          ASC   "SPEECH BOARD NOT FOUND"
          DFB   0
          JMP   FILL
SLOTTED   STX   STATUS+1
          LDA   #0                SET STATUS CARD POINTER
          STA   STATUS
          JSR   CRLF
          JSR   DOTEXT
          ASC   "SPEECH BOARD IN SLOT *"
          DFB   0
          LDA   STATUS+1
          AND   *7
          STA   SLOT              NOT CORRECT SLOT X $16 YET
          ORA   *$H0              CONVERT TO ASCII
          JSR   COUT
          JSR   CRLF
*
          LDA   SLOT              SLOT X $16 = SLOT.
          ASL
          ASL
          ASL
          ASL
          STA   SLOT
          ORA   *$80              LOW OF $C080 + $16(SLOT)
          STA   MEMORY            MUST USE (MEMORY,X) ADDRESS MODE;
          LDA   #$C0              MEM,Y OR (MEM),Y CAUSE DOUBLE
          STA   MEMORY+1          ACCESS: SKIPS MEMORY LOCATIONS!
```

The following code asks the speech processor how large its memory is. For purposes of this disclosure, it is assumed that the speech processor has a full size 64K RAM, and all code relating to the handling of smaller size memories has been deleted. A flow chart appears in FIG. 15.

```
*
*    FILL RAM FOR SIZE CALCULATION
*
          LDY   SLOT
          LDX   #0
          LDA   RESET0, Y         ZERO ADDRESS
          LDA   #$FF
          STA   (MEMORY, X)       FF=0000
          LDA   #0
          STA   (MEMORY, X)       00=0001
          LDA   ENABLE, Y         ENABLE 6500
BITSIZE   LDA   #255              255 MS TIMEOUT
          STA   TEMP
          LDY   SLOT
BITLOOP   LDA   (STATUS), Y
          AND   #4
          BNE   GOTBIT            BIT=1 WHEN MEMORY SIZE KNOWN
```

```
          LDX   #$C5        GIVES 1 MS DELAY
          JSR   DELAY
          DEC   TEMP
          BNE   BITLOOP     LOOP UNTIL GOTBIT OR TIMEOUT
*
          JSR   CRLF
          JSR   DOTEXT
          ASC   "TIMED OUT WAITING FOR MEMORY SIZE"
          DFB   0
GOTBIT    JSR   CRLF
          LDY   SLOT
          LDA   (STATUS), Y  READ MEMORY CODE FROM 6500.
          AND   #3
          STA   BITS
*
* SET DIAGNOSTIC MEMORY LIMITS
*
          LDY   #0          8 BIT LIMIT
          STY   LIMIT
```

The routine FILL, flow charted in FIG. 10, transfers speech data from the disk file SOUNDTRACK into the speech processor's RAM and illustrates how speech data is loaded into the speech processor.

```
*
* FILL MEMORY ACCORDING TO # BITS/BYTE
*
FILL      JSR   CRLF
          JSR   DOTEXT
          ASC   "LOAD SOUNDTRACK?"
          DFB   0
          LDA   CLRKEY
          JSR   RDKEY       GET RESPONSE
          JSR   COUT
          AND   #$7F        CONVERT TO ASCII
          CMP   #'Y
          BNE   SIMENU
          JSR   DOTEXT
          HEX   SD84        DOS CODE
          ASC   "BLOAD SOUNDTRACK, A$7000"
          HEX   *D00
*
          LDY   SLOT
          LDA   RESET0, Y   ZERO ADDRESS
          LDX   #$70        HI BUFFER START
          STX   ADDR+1
          LDY   #0          LO BUFFER START
          STY   ADDR
*
CRAMIT    LDA   (ADDR), Y   READ BUFFER DATA
          JSR   STORE       INTO DRAM
          INY
          BNE   CRAMIT
          INC   ADDR+1
          LDX   ADDR+1
          CPX   #$79        DONE?
          BCC   CRAMIT
```

The routine SIMENU and SIMULATE, flow charted in FIGS. 10 and 11, asks the user for a speech phrase request number and then initiates operation of the speech processor.

```
*
**            SIMULATE
*
* FUNCTION:  SIMULATE APPLE WITH INDEPEN-
             DENT 6500 ONBOARD
* INPUTS:    ACCEPTS CHARS FROM ITS MENU
* OUTPUTS:   INSERTS COMMANDS INTO DRAM,
             AND EXECUTES
* DESTROYS:  A, X, Y, PHRASES
* CALLS:     SAYTHIS, MESAGE, RDKEY, DOTEXT
*
SIMENU    JSR   CRLF
```

```
                    -continued
          JSR   CRLF
          JSR   CRLF
          JSR   DOTEXT
          ASC   "APPLE SPEECH SIMULATOR
                MENU"
          DFB   0
          JSR   CRLF
          JSR   CRLF
          JSR   DOTEXT
          ASC   "A, SINGLE PHRASE"
          DFB   0
          JSR   CRLF
          JSR   DOTEXT
          ASC   "B, MULTI-PHRASE"
          DFB   0
          JSR   CRLF
          JSR   DOTEXT
          ASC   "C, RESTART SPEECH BOARD"
          DFB   0
          JSR   CRLF
          JSR   DOTEXT
          ASC   "X, EXIT TO APPLE MONITOR"
          DFB   0
SIMULAT   JSR   CRLF
          LDX   #0
          JSR   MESAGE      "YOUR CHOICE?"
*
          LDA   CLRKEY      CLEAR KEY FLAG
          JSR   RDKEY       GET RESPONSE
          JSR   COUT
          AND   #$7F
          CMP   #'A
          BEQ   SIMA        ONE PHRASE
          CMP   #'B
          BEQ   SIMB        MULTI PHRASES
          CMP   #'X
          BEQ   MONOUT      TO APPLE MONITOR
          JMP   SIMENU      ILLEGAL INPUT
MONOUT    JMP   $FF69       APPLE MONITOR
```

The routine SIMA, flow charted in FIG. 12, accepts a single speech phrase number and passes it to the speech processor.

```
*
* SINGLE PHRASE
*
SIMA      JSR   BUSY        6500 BUSY?
          BCC   AOK
          JMP   SIMULAT
AOK       LDY   SLOT
          STA   RESET0, Y   RESET ADDRESS
                            COUNTERS
          JSR   SAYTHIS     GET PARAMETERS
          BCS   SIMA        ILLEGAL PHRASE #
LEAVE 2   LDY   SLOT
```

```
         LDA    ENABLE, Y   ENABLE 6500
SIMULA 1 JMP    SIMULAT     NO DATA EXPECTED
```

Figure 13:
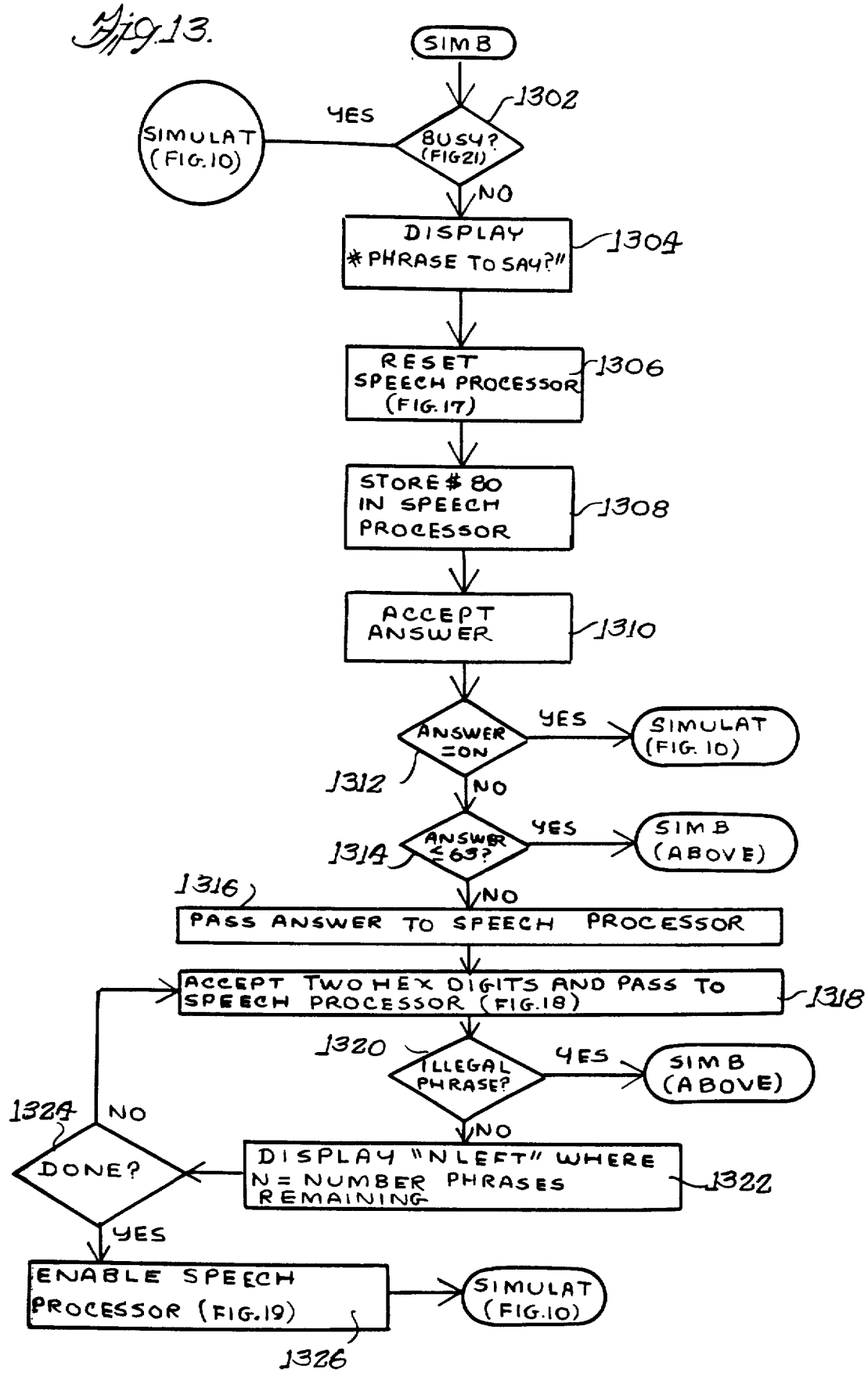
FIG. 13 is a flow diagram of the SIMB portion of the speech control program 104.

The routine SIMB, flow charted in FIG. 13, accepts a multiple speech phrase request and passes it on to the speech processor.

```
*
*  MULTI-PHRASE
*
SIMB    JSR    BUSY              6500 BUSY?
        BCC    BOK
        JMP    SIMULAT
SOX     LDX    #2
        JSR    MESAGE            "# PHRASES TO SAY?"
        LDY    SLOT
        LDA    RESET0, Y         ZERO ADDRESS
                                 COUNTERS
        LDA    #$80              MULTI CODE
        JSR    STORE
        JSR    PACK              GET # OF PHRASES
        BEQ    SIMULA 1          OUT FOR NONE
        CMP    #63+1             MAX PHRASES
        BCS    SIMB
        STA    PHRASES
        JSR    STORE             # TO DO
INMULTI NOP
        JSR    SAYTHIS           COLLECT PARAMETERS
        BCS    SIMB              ILLEGAL INPUT
        JSR    SPACE
        JSR    SPACE
        LDX    PHRASES
        DEX
        TXA
        JSR    PRBYTE            NUMBERING PROMPT
        JSR    DOTEXT
        ASC    "LEFT."
        DFB    0
        DEC    PHRASES
        BNE    INMULTI           SET PARAMETERS FOR
                                 ALL PHRASES
        JMP    LEAVE 2           DO IT.
```

The following subroutines, listed in alphabetical order, support the operation of the above routines.

```
*
*
*                    BUSY CHECK
*
*       FUNCTION:    SEE IF 6500/1 IS AVAILABLE FOR COMMANDS
*       INPUTS:      6500/1 STATUS, SLOT
*       OUTPUTS:     MESSAGE AND C=1 IF BUSY.
*       DESTROYS:    A,Y
*
BUSY        LDY    SLOT
            LDA    (STATUS), Y    IS 6500 BUSY?
            AND    #$80           BIT 7 IS BUSY BIT
            BEQ    NOTBUSY        BUSY
            JSR    CRLF
            JSR    DOTEXT
            ASC    "SPEECH BOARD IS BUSY NOW."
            DFB    0
            SEC                   ;BUSY FLAG
            RTS
NOTBUSY     CLC                   ;NOT BUSY FLAG
            RTS
*
*                    RETURN & LINE FEED
*
*       FUNCTION:    DISPLAY RETURN & LINE FEED TO TERMINAL
*       INPUTS:      NONE
*       OUTPUTS:     CR & LF
*       DESTROYS:    NIL
*       CALLS:       COUT
*
CRLF        PHA
            LDA    #$8D
            JSR    COUT
            PLA
            RTS
*
*                    PROGRAMMABLE DELAY
*
*       FUNCTION:    DELAY
*       INPUTS:      X HAS DELAY PARAMETER
*       OUTPUTS      DELAY = 12 + 5X MICROSECONDS AT 1MHZ
*       DESTROYS:    X=0
DELAY       DEX
            BNE    DELAY
            RTS
*
*                    DISPLAY TEXT
*
*       FUNCTION:    DISPLAY MESSAGES TO THE CRT.
*       INPUTS:      ASCII STRING ATER THE JSR, $00 END FLAG
*       OUTPUTS:     CRT MESSAGE DISPLAY
*       DESTROYS:    A, Y, TEXT
*
DOTEXT      PLA
```

-continued

```
              STA   TEXT        RETURN ADDRESS = MESSAGE START
              PLA
              STA   TEXT+1
              LDY   #1
*
GETCHR        LDA   (TEXT), Y   GET MESSAGE BYTE
              BEQ   TXTEND      0=MESSAGE END
              JSR   COUT
              INY
              BNE   GETCHR      MAX 355 CHAR
TXTEND        TYA
              CLC
              ADC   TEXT        RETURN = TEXT + Y OFFSET
              STA   TEXT
              LDA   #0
              ADC   TEXT+1
              PHA   PUSH        HI PART FIRST
              LDA   TEXT
              PHA   PUSH        LO PART LAST
              RTS
*
*
*                   MESAGE
*
*    FUNCTION:      DISPLAY ERROR MESSAGES
*    INPUTS:        X = MESSAGE NUMBER
*    OUTPUTS:       VIDEO TEXT
*    DESTROYS:      ALL
*    CALLS:         CRLF, PRTBYTE, OUTPUT
*
MESAGE        JSR   CRLF
*
*    MAKE MESSAGE OFFSET FROM X
*
              TXA               ;MULTIPLY BY 16
              ASL
              ASL
              ASL
              ASL
              TAY
*
              LDX   #16-1       # CHARACTERS TO DISPLAY
PRTERR        LDA   MESS, Y
              JSR   COUT
              INY
              DEX
              BPL   PRTERR      DO ALL CHARACTERS
              RTS
*
*
*    M M M M M M M M M M M M M M M
*
*    CHAR         0         1
*    POSITION:    1234567890123456
MESS          ASC  "YOUR CHOICE?"  0
              ASC  "PHRASE 0000-0260"  1
              ASC  "# PHRASES TO DO?"  2
              HEX  11111111111111111111111111111111
              HEX  11111111111111111111111111111111
              ASC  "DIAG"
              HEX  830201
              HEX  11111111111111111111111111111111
*
*                   PACK ASCII TO HEX
*
*    FUNCTION:      CONVERT 2 ASCII BYTES TO 1 HEX BYTE
*    INPUTS:        2 ASCII HEX BYTES FROM TI ENCODER
*    OUTPUTS:       A = HEX BYTE, C=1 IF ERROR
*    DESTROYS:      A, CHAR
*    CALLS:         RDKEY, ASCBIN
*
PACK          JSR   RDKEY       GET ASCII DATA
              JSR   COUT
              JSR   ASCBIN      CONVERT TO BINARY
              BCS   NOTHEX      FOR NON HEX DATA
              ASL
              ASL               ;MOVE TO LEFT NIBBLE
              ASL
              ASL
              STA   CHAR
              JSR   RDKEY       GET 2ND CHAR
              JSR   COUT
              JSR   ASCBIN      CONVERT TO BINARY
```

|         | BCS | NOTHEX | FOR NON HEX DATA |
|---------|-----|--------|------------------|
|         | ORA | CHAR   | COMBINE NIBBLES |
|         | CLC | NO     | ERROR |
| PAKOUT  | RTS |        | |
| NOTHEX  | LDA | #$A4   | $ = NON HEX DATA |
|         | JSR | COUT   | |
|         | LDA | ASCII  | GET BAD ASCBIN # |
|         | JSR | PRBYTE | |
|         | SEC |        | ;ERROR FLAG |
|         | RTS |        | |

* 
* 
*                   CONVERT ASCII TO BINARY
* 
*   FUNCTION:  CONVERT ASCII BYTE TO BINARY BYTE
*   INPUTS:    A=ASCII INPUT
*   OUTPUTS:   A=BINARY (0-F), C=1 IF NON HEX INPUT
*   DESTROYS:  A, ASCII

|         | | | |
|---------|-----|--------|------------------|
| ASCBIN  | AND | #$7F   | |
|         | STA | ASCII  | |
|         | CLD |        | |
|         | CMP | #$3A   | ASCII NUMBER? |
|         | BMI | NUMBER | |
|         | CMP | #$41   | BETWEEN A-F? |
|         | BMI | OUT    | NON-HEX |
|         | CMP | #$42   | OVER F? |
|         | BPL | OUT    | NON-HEX |
|         | SEC |        | |
|         | SBC | #7     | PARTIAL CONVERSION OF A-F |
| NUMBER  | SEC |        | |
|         | SBC | #$30   | CONVERT NUMBERS 0-9 |
|         | BMI | OUT    | NON-HEX |
|         | CLC |        | |
|         | RTS |        | |
| *       |     |        | |
| OUT     | SEC | ERROR  | EXIT |
|         | RTS |        | |

* 
*                   SAY THIS
* 
*   FUNCTION:  COLLECT PHRASE NUMBERS
*   INPUTS:    4 DIGIT HEX PHRASE #, 000-260, C000-
*   OUTPUTS:   PLACE COMMANDS INTO DRAM, C SET IF ERROR.
*   DESTROYS:  DRAM, A
*   CALLS:     RDKEY, PACK
*

|         | | | |
|---------|-----|--------|------------------|
| SAYTHIS | LDX | #1     | |
|         | JSR | MESAGE | "HEX PHRASE #" |
|         | JSR | SPACE  | |
|         | JSR | PACK   | GET HI ADDRESS |
|         | CMP | #2+1   | OVER SPEECH? |
|         | BCS | NOVOICE | NOT SPEECH |
| DELCODE | JSR | STORE  | INTO DRAM |
|         | JSR | PACK   | |
|         | JSR | STORE  | |
|         | CLC |        | |
|         | RTS |        | |
| *       |     |        | |
| NOVOICE | CMP | #$C0   | DELAY? |
|         | BCS | DELCODE |  |
|         | SEC |        | ;ERROR FLAG |
|         | RTS |        | |

* 
*                   SPACE
* 
*   FUNCTION:  OUTPUT SPACE FOR APPLE
*   INPUTS:    ENTRY
*   OUTPUTS:   SPACE
*   DESTROYS:  A
*   CALLS:     COUT
*

|         | | | |
|---------|-----|--------|------------------|
| SPACE   | LDA | #$A0   | |
|         | JMP | COUT   | |

* 
*                   STORE INTO MEMORY
* 
*   FUNCTION:  MEMORY STORE
*   INPUTS:    A=DATA, NUMBITS, (SLOT)
*   OUTPUTS:   DATA INTO 1 MEMORY LOCATION
*   DESTROYS:  A, TEMP
*

| STORE | PHA | | |

-continued

```
STX   TEMP
LDX   #0       SETUP INDEX
```

Processor Control Program Listing

The following is the actual program used to program the microcomputer in the preferred embodiment of the invention. Maintenance and diagnostic routines and other material not essential to understanding the present invention have been omitted to keep the listing as simple and a understandable as possible.

FIGS. 22 through 29 of the drawings constitute a complete, detailed flow diagram of the programs that follow. Program address and subroutine names and some variable names are the same in both the flow diagram and in the programs that follow. The main program is set out first, and it is followed by the subroutines which are arranged in alphabetical order.

As the "I/O PORT ASSIGNMENTS" portion of this listing indicates, microcomputer port A is addressed as "PRE64," 0 port B is addressed as "STAT65," port C is address as "MASTER," and port D is addressed as "D5220." The bit assignments within these locations to external signals is also set out in this section. With reference to "MASTER" or "PORT C:" the NEXT signal is called NXT and is assigned to bit 5; the EN DATA signal is called EN and is assigned to bit 3; the LOAD signal is called LD and is assigned to bit 1; and the BD EN signal is called BDEN and is assigned to bit 0. The four remaining signals, RDY, INT, RS, and WS all flow between the voice synthesizer and the microcomputer.

The following table assigns names and locations to variables and assigns names to the system ports and control register.

```
*
*  PAGE ZERO VARIABLES
*
OFF       EQU   0           NO OFSET IN R6500
ADDR0     EQU   0+OFF       DATA FROM ADDRESS 0
ADDR1     EQU   1+OFF       DATA FROM ADDRESS 1
NUMBITS   EQU   2+OFF       NUMBER OF BITS IN RAM BYTE
LIMIT     EQU   3+OFF       DIAGNOSTIC MEMORY LIMIT
TEXT      EQU   4+OFF       — TEXT ADDRESS
ASCII     EQU   6+OFF       — NOT USED IN R6500
CHAR      EQU   7+OFF       — NOT USED IN R6500
ADDR      EQU   8+OFF       TABLE, DEBUG USE
PATERN    EQU   $A+OFF      — MEMORY TESTING PATTERN
START     EQU   $B+OFF      — EXAMINE MEMORY START, LOW
MEND      EQU   $D+OFF      — EXAMINE END, LOW
PHRASE    EQU   $10+OFF     CURRENT PHRASE #, 1-31 (0=SINGLE)
PHRASES   EQU   $11+OFF     TOTAL # OF PHRASES TO DO, 1-31
BYTE      EQU   $12+OFF     — SCRATCHPAD FOR RAM READ
COMMAND   EQU   $13+OFF     — DIAG COMMAND
TEMPX     EQU   $14+OFF     — TEMPORARY X
TEMPY     EQU   $15+OFF     — TEMPORARY Y
DATADEL   EQU   $16+OFF     — INTER-DATA DELAY IN MS
SUM80     EQU   $17+OFF     — DATA CHECKSUM GIVEN BY TEST A
*
MEMORG    EQU   $800        R6500 START
*
*  I/O PORT ASSIGNMENTS
*
PRE64     EQU   $80         PORT A
STAT65    EQU   $81         PORT B
*
*  |BUSY|1|0|1|1|VALID|B1|B2|
*  BIT 7  6 5 4 3    2   1  0
*
*  MEMORY BIT WIDTH:   VALID  B1  B2   MODE      MEMORY
*                        0    X   X    INVALID   SIZE
*   INIT:    SB           1    0   0    2 BITS    16K
*   BITS:    58 + N       1    0   1    4 BITS    32K
*   TALK:    D8 + N       1    1   0    6 BITS    48K
*   DONE:    58 + N       1    1   1    8 BITS    64K
MASTER    EQU   $82         PORT C
*
*  |/RDY|/INT|/NXT|/RS|/EN|/WS|/LD|BDEN|
*  BIT 7  6    5    4   3   2   1   0
*  USE 1  1    0    1   1   1   1   1
D5220     EQU   $83         PORT D
*
*  |TALKING|BUFFER LOW|BUFFER EMPTY|1|
*  BIT 7         4           5      4
*
CONTROL   EQU   $8F         CONTROL REGISTER
```

The following speech processor memory map and speech command key forms a part of the processor control program's comments.

```
*
*                DYNAMIC RAM ALLOCATION
*
*    FFFF
*
*
*
*                TI 5220
*                SPEECH DATA
*    0540
*
*    053F        HIGH SOUNDTRACK #
*    053E        LOW SOUNDTRACK #
*    053D        HI LAST VALID DATA ADDR
*    053C        LO LAST VALID DATA ADDR
*
*    053B        VECTORS TO SPEECH DATA
*    0082        IN LOW, HI FORMAT
*
*    0081        UNUSED
*    0080        STORED DATA CHECKSUM
*
*    007F        SPEECH COMMANDS AND
*                DIAGNOSTIC PARAMETERS
*                0=PHRASE # HI, 1=LOW
*    0000
*
*
*    SPEECH COMMANDS (HI PART)
*
*    00-02       SPEAK THIS PHRASE (TO $260)
*    10-1F       DIAGNOSTICS
*    20-7F
*    80          MULTIPHRASE SPEAK
*    81-BF
*    C0-FF       PROGRAMMED DELAY
*
*
```

The program segment which follows initializes the microcomputer. Some portions which have been omitted determine how much memory is present and set a value in location NUMBITS to indicate the memory size. For purposes of this description, a full 64K memory is assumed, and NUMBITS therefore contains the integer 3 to signal this fact. The program comments are retained unchanged from the actual program listing.

```
*
*    INITIALIZE ALL I/O PORTS
*
         ORG     MEMORG
*
RESET    JMP     RES1
         JMP     SCAN
         JMP     ENWAIT1    SIMULATION
         JMP     ENWAIT2    SIMULATION RE-ENTRY
         JMP     BITSET     SIMULATION
RES1     NOP
         LDA     #0
         STA     CONTROL    R6500 CONTROL REG
         LDX     #$3F
         TXS
         LDA     #$FF
         STA     PRE64
         STA     D5220
*
         LDX     #$3F       SET ALL PAGE ZERO
                            RAM TO $11
         LDA     #$11       TO CLEAN UP
                            DIAGNOSTIC 'F'
INITRAM  STA     $0,X
         DEX
         BNE     INITRAM
```

```
         LDA     #$FF
         STA     MASTER     SET CONTROLS
         LDA     #$5B       SHOW STATUS: APPLE
                            FINDS SLOT #
         STA     STAT65
         LDA     #19        19 MS DATA DELAY
         STA     DATADEL
*
*    INITIALIZE SYNTHESIZER
*
         LDY     #9         WRITE 9 $FF BYTES
ISYN     LDA     #$FF
         JSR     WRITE      WRITE TO 5220
         LDX     #60
         JSR     DELAY      NEED 300 US RESET
                            DELAY
         DEY
         BNE     ISYN       DO ALL 9 FF'S
```

The main processor control program listing follows. It is flow charted in FIGS. 22 through 25, starting with the entry SCAN in FIG. 25.

```
*
*    MAIN PROGRAM
*
*
SCAN     LDA     #$FD
         STA     MASTER     /LOAD=0
         LDA     #$FF       /LOAD=1
         STA     MASTER     DISABLE BOARD
         LDA     NUMBITS
         AND     #$7F
         STA     STAT65     RESET BUSY LINE
                            BUSY = 0
ENWAIT2  LDA     MASTER     WAIT FOR NEXT
                            BOARD ENABLE
         AND     #1
         BEQ     ENWAIT2
*
         LDA     NUMBITS
         ORA     #$80       BUSY=1 IN STATUS
         STA     STAT65
         LDA     #0
         STA     PHRASE     DEFAULT TO SINGLE
                            PHRASE
         LDA     #1
         STA     PHRASES    DEFAULT 1 PHRASE
*
*    GET COMMANDS
*
         JSR     READ01     READ LOC 0 & 1
         LDA     ADDR0
         CMP     #2+1       PHRASE $300 PAST
                            LIMIT
         BCC     SPEECH     DO SPEECH
         BNE     NOTALK     NOT SPEECH
         LDX     ADDR1
         CPX     #$60       MAX PHRASE IS # $25F
         BCC     SPEECH
NOTALK   CMP     #128       MULTIPHRASE
                            COMMAND
         BNE     NOMULTI
*
         LDA     #1
         STA     PHRASE     FIRST ONE TO SAY
         LDA     ADDR1
         AND     #$1F       MAX # OF PHRASES
         STA     PHRASES
         JMP     SPEECH
NOMULTI  CMP     #$C0       DELAY?
         BCS     DELA
         CMP     #$20       DIAGNOSTIC?
         BCS     SCAN       ERROR INPUT
DELA     JSR     DODELAY
         JMP     SCAN
```

The SPEECH segment is flow charted beginning in FIG. 23 and the TABLED segment is flow charted in FIG. 24.

```
*
* GET WORD START FROM THE TABLE
*
SPEECH    LDA     PHRASE      = 0 FOR SINGLE PHRASE, 1-31 ELSE
          BEQ     SINGLE
          JSR     READ01      SYNC TO LOCATION 2
          LDA     PHRASE      PHRASE # = INDEX
          AND     #$1F
          TAX
*
NEXTSET   JSR     READMEM     NEXT PHRASE PARAMETERS
          STA     ADDR0
          JSR     READMEM
          STA     ADDR1       SET FOR PHRASE N+1
          DEX                 :X = CURRENT PHRASE #
          BNE     NEXTSET     LOOP TILL PROPER PHRASE INDEXED
          INC     PHRASE      POINT TO NEXT PHRASE
          LDA     ADDR0
          CMP     #$C0        IS THIS A DELAY?
          BCC     SINGLE      NO
          JSR     DODELAY     DO DELAY
          DEC     PHRASES
          BNE     SPEECH      MORE TO SAY!.
          JMP     DONESAY     DONE WITH SPEECH
*
SINGLE    ASL     ADDR1       DOUBLE INDEX
          ROL     ADDR0
          LDA     ADDR1       ADD 80 OFFSET
          CLD
          CLC
          ADC     #$80        $80 OFFSET TO TABLE
          STA     ADDR        LO TABLE ADDRESS
          LDA     #0
          ADC     ADDR0
          STA     ADDR+1      HI TABLE ADDRESS
          JSR     PRESET      SET HI TABLE ADDRESS
          LDX     ADDR        AUTO-INC TO LOW TABLE ADDRESS
          BEQ     TABLED      ALREADY AT TABLE ADDRESS
AUTO1     JSR     READMEM     TOO SLOW!
          DEX
          BNE     AUTO1       KEEP GOING
*
TABLED    JSR     READMEM     READ LOW SPEECH DATA ADDRESS
          STA     ADDR0
          JSR     READMEM     READ HI SPEECH DATA ADDRESS
          JSR     PRESET
          LDA     ADDR0
          LDX     ADDR0       AUTO-INC TO LOW DATA ADDRESS
          BEQ     DATADDR     ALREADY AT DATA ADDRESS
AUTO2     JSR     READMEM     TOO SLOW!
          DEX
          BNE     AUTO2       KEEP GOING
DATADDR   NOP
*
```

The segment DATADDR, which appears below, is also flow charted in FIG. 24.

```
*
* RESET SYNTHESIZER
*
          LDA     #$FF        RESET COMMAND
          JSR     WRITE       SEND TO 5220
          LDX     #60         300 US DELAY
          JSR     DELAY
*
* SAY CURRENT PHRASE
*
          JSR     SAY
          BCS     SAYWHAT     STATUS BAD, ERROR
                              EXIT
          DEC     PHRASES     GO TO NEXT PHRASE
          BEQ     DONESAY
```

```
          JMP     SPEECH      NEXT IN MULTIPHRASE
                              SEQUENCE.
```

```
DONESAY   LDA     NUMBITS
          STA     STAT65      BUSY=0 IN STATUS
          JMP     SCAN        SCAN FOR NEXT INPUT
*
* ERROR EXIT
*
SAYWHAT   CLC
          JMP     SCAN        FATAL ERROR:
                              RESTART
*
```

The subroutines that form a portion of the processor control programs are set forth below, together with the comments from the actual program listing. The subroutines are set forth in alphabetical order. Flow charts of the more important subroutines appear in FIGS. 25 to 29 of the drawings.

-continued

```
                    PROGRAMMABLE DELAY

*  FUNCTION:  DELAY
*  INPUTS:    X HAS DELAY PARAMETER
*  OUTPUTS    DELAY = 12+ 5X MICROSECONDS AT 1 MHZ
*  DESTROYS:  X=0
*
DELAY      DEX
           BNE     DELAY
           RTS
*
*                    DELAY COMMAND
*
*  FUNCTION:  DO DELAY COMMAND
*  INPUTS:    (ADDR0 - C0) * 3.2 SEC = DELAY (HI)
*
*    | -1- | -1- | 102.4 | 51.2 | 25.6 | 12.8 | 6.4 | 3.2 |
*
*              ADDR1 * 12.5 MS = DELAY (LOW)
*
*    | 1.6 | 0.8 | 0.4 | 0.2 | 0.1 | 0.05 | 0.025 | 0.0125 |
*  OUTPUTS:   DELAY OF 12.5 MS TO 102.4 SEC (1.023 MHZ)
*  DESTROYS:  A,X,Y,ADDR0,ADDR1
*  CALLS:     LODELAY, HIDELAY
*
DODELAY    LDA     ADDR1      LOW PART OF DELAY COMMAND
           BEQ     NOLODEL    NO LOW DELAY
DOLODEL    JSR     LODELAY    12.5 MS
           DEC     ADDR1
           BNE     DOLODEL
*
NOLODEL    LDA     ADDR0      HI PART OF DELAY COMMAND
           AND     #$3F       REMOVE C0 COMMAND
           STA     ADDR0
           BEQ     NOHIDEL    NO HI DELAY
DOHIDEL    JSR     HIDELAY    3.2 SEC
           DEC     ADDR0
           BNE     DOHIDEL
NOHIDEL    RTS
*
*                        HIDELAY
*
*  FUNCTION:  HIGHER PART OF DODELAY
*  INPUTS:    NONE
*  OUTPUTS:   3.2 SECOND DELAY
*  DESTROYS:  A,X,Y
*
HIDELAY    LDX     #128       128 * 25 MS = 3.2 SECONDS
HIDEL1     TXA
           JSR     LODELAY    12.5 MS
           JSR     LODELAY    12.5 MS
           TAX
           DEX
           BNE     HIDEL1
*                            25 MS
           RTS
*
*                        LODELAY
*
*  FUNCTION:  LOWER PART OF DODELAY
*  INPUTS:    1.023 MHZ CLOCK
*  OUTPUTS:   12.5 MS DELAY
*  DESTROYS:  X, Y
*
LODELAY    LDY     #25        25 * .5 = 12.3 MS
LODEL2     LDX     #102
LODEL1     DEX                ;2
           BNE     LODEL1     ;3
*                             5 CYCLES * 102 = 0.5 MS
           DEY
           BNE     LODEL2
           RTS
*
*                        PRESET
*
*  FUNCTION:  PRESET DRAM HI ADDRESS, ALLOW FOR VARIABLE
*             BIT WIDTH MEMORY.
*  INPUTS:    A = HIGH OFFSET
*  OUTPUTS:   ADDRESS = (A),00. C SET ON OVERFLOW.
*  DESTROYS:  X
*
```

-continued

```
PRESET    PHA
SET       STA    PRE64      SET HI COUNTERS
          LDA    #$FD       /LOAD=0
          LDX    #$FF       /LOAD=1
          STA    MASTER
          STX    MASTER
          STA    MASTER     PRESET TWICE FOR INSURANCE
          STX    MASTER
          LDX    #$FF
          STX    PRE64      CHANGE TO INPUT PORT
          CLC               ;CLEAR ERROR FLAG
PREBAD    PLA
          RTS
*
*                    READ COMMAND
*
*
* FUNCTION: GET FIRST TWO BYTES FROM DRAM
* INPUTS:   NUMBITS FOR 'READMEM'
* OUTPUTS:  $0=>ADDR0, $1=>ADDR1
* DESTROYS: ADDR0,ADDR1,A
* CALLS:    PRESET, READMEM
*
READ01    LDA    #0         PRESET AT $0000
          JSR    PRESET
          JSR    READMEM
          STA    ADDR0
          JSR    READMEM
          STA    ADDR1
          RTS
*
*                    READ MEMORY
*
*
* FUNCTION: GET FULL 8 BITS FROM DYNAMIC RAM
* INPUTS:   MUST BE PRESET TO ADDRESS, NUMBITS
* OUTPUTS:  A= DATA
* DESTROY:  A, BYTE
* CALLS:    READBIT
*
READMEM   JMP    READBIT    GETS ALL 8 BITS
*
READBIT   LDA    #$DF       NEXT = 0
          STA    MASTER
          LDA    #$F7       NEXT=1, /EN=0
          STA    MASTER
          LDA    PRE64      READ DATA
          PHA
          LDA    #$FF       /EN =1
          STA    MASTER
          PLA
          RTS
*
*                    SAY WORDS
*
*
* FUNCTION: SAY THE CURRENT WORD
* INPUTS:   AUTO INC RAM IS INDEXED TO PROPER DATA
* OUTPUTS:  SPEECH THROUGH THE TI 5220
* DESTROYS: A,X,Y,ADDR
* CALLS:    STATUS, WRITE, READMEM
*
SAY       JSR    STATUS     GET 5220 STATUS
          AND    #4         EXPOSE ONLY TALK STATUS
          BNE    SAY        WAIT TILL DONE TALKING (=0)
          LDA    #$60       SPEAK EXTERNAL COMMAND
          JSR    WRITE
          LDX    #5
          JSR    DELAY      MUST WAIT 42 US BEFORE DATA
          JSR    READMEM    GET DATA
          JSR    WRITE      PUT INTO 5220 FIFO REGISTER
*
* REFILL 5220 SPEECH DATA FIFO REGISTER
*
REFILL    LDX    #8         PUT 8 MORE BYTES IN
FILL      JSR    READMEM    GET DATA
          JSR    WRITE      PUT IN 5220
          DEX
          BNE    FILL       8 LOOPS
*
* SERVICE SYNTHESIZER
*
SERVE     LDA    MASTER     GET INTERRUPT STATUS
          ASL
          BMI    SERVE      WAIT TILL INTERRUPT IS LOW (BIT 6)
```

-continued

```
         JSR    STATUS     READ 5220 STATUS
         CMP    #6
         BEQ    REFILL     FIFO NEEDS MORE DATA
         CMP    #0
         BEQ    SAID       SAID WORD OK
         CMP    #4
         BEQ    SERVE      IGNORE FALSE INTERRUPT
         SEC               ;SET ERROR FLAG
         RTS
SAID     CLC               ;CLEAR ERROR FLAG
         RTS
*
*
*                         READ 5220 STATUS
*
* FUNCTION:  PUT 5220 STATUS IN A
* INPUTS:    5220 STATUS
* OUTPUTS:   A:
                 |TALKING|BUFFER LOW|BUFFER EMPTY|
                 BIT 2      1           0
* DESTROYS   A,X
*
STATUS   NOP
         LDA    #$FF       BECOME INPUTS
         STA    D5220
         LDA    #$EF       /RS=0
         STA    MASTER     LOWER /RS
WAITR    LDA    MASTER
         BMI    WAITR      WAIT TILL /RDY IS LOW
         LDX    D5220      GET STATUS
         LDA    #$FF       /RS=1
         STA    MASTER     RAISE /RS
         TXA
         ROR
         ROR               ;PLACE BITS 5-7 INTO BITS 0-2
         ROR
         ROR
         ROR
         AND    #7         MASK GARBAGE
         RTS
*
*
*                         WRITE TO 5220
*
* FUNCTION:  OUTPUT A TO 5220, RETURN WHEN /RDY IS LOW
* INPUTS:    A
* OUTPUTS:   A TO 5220 DATA BUS
* DESTROYS:  A
*
WRITE    STA    D5220      COMMAND OR DATA TO 5220
         LDA    #$FB       /WS=0
         STA    MASTER     LOWER /WS WRITE LINE
WAITW    LDA    MASTER
         BMI    WAITW      WAIT TILL /RDY LINE IS LOW
         LDA    #$FF       /WS=1
         STA    MASTER     RAISE /WS WRITE LINE
         RTS
```

While the preferred embodiment of the invention has been described, it will be understood by those skilled in the art that numerous modifications and changes can be made without departing from the spirit of the invention. The claims that follow are intended to define the true spirit and scope of the invention.

What is claimed is:

1. A computer system comprising:

a programmable computer having a defined memory space;

a speech processor having a voice synthesizer, a read/write speech memory, and a programmable microcomputer including means for communicating with said speech memory and said voice synthesizer and programmed with control programs to scan said speech memory and respond to command and speech data entries therein by transferring arbitrary sequences of data entries from said speech memory to said voice synthesizer;

first data conveyance means connecting said computer to said speech memory for transferring data supplied by said computer into said speech memory;

second data conveyance means connecting said computer to said speech memory for transferring data stored in said speech memory to said computer;

an enable line, connecting said computer to said microcomputer, arranged to initiate operation of the control programs stored in said microcomputer when the enable line is energized by said computer; and system programs controlling the operation of said computer including data write command sequences which cause said computer to store data in said speech memory, data read command sequences which cause said computer to read data stored in said speech memory, and speech processor enabling command sequences which cause said computer to energize said enable signal line.

2. A computer system as set forth in claim 1 wherein said first and second data conveyance means include:
   means for sequentially addressing memory locations in said speech memory;
   means for setting said addressing means to the initial address of said speech memory; and
   means for incrementing said addressing means to address sequential locations of said speech memory.

3. A computer system a set forth in claim 2 wherein said speech memory comprises:
   dynamic random access memory; and
   means for periodically refreshing said dynamic memory.

4. A computer system as set forth in claim 2 wherein said computer includes a data bus and said second data conveyance means includes:
   a data path communicating information from the output of said speech memory to said data bus of said computer.

5. A computer system as set forth in claim 4 which further includes:
   a buffer disposed between said data path and said data bus; and
   means for enabling said buffer with a read data signal.

6. A computer system as set forth in claim 5 wherein said enabling means includes:
   means for generating said read data signal subsequent to an incrementation of said address means and in response to a memory enable command by said computer.

7. A method of storing and retrieving a data file in a speech memory of a speech processor adapted for use with a programmable computer, said method comprising:
   generating a device select signal to enable a decoding means;
   generating an address from said computer which is decoded by said decoding means into a control signal which causes a speech memory address control to address the initial location of speech memory;
   generating a write signal from said computer;
   generating an address from said computer which is decoded by said decoder into a control signal causing said memory address control to increment the location address of said speech memory and in combination with said write signal enables said speech memory to write a data word from said computer;
   generating a read signal from said computer;
   generating an address from said computer which is decoded by said decoding means into a control signal causing said memory address control to increment the location address of said speech memory and in combination with said read signal enables said speech memory to output a data word that can be read by said computer.

8. A method as defined in claim 7 which further includes the step of:
   buffering and outputting said output data word to the data bus of said programmable computer in response to said read signal.

9. A method as defined in claim 8 which further includes the step of:
   generating a clock signal to automatically increment the addresses of said speech memory when accessed.

10. A computer system as defined in claim 2 which further includes:
    means for generating an interrupt signal to said microcomputer from said computer.

11. A computer system as defined in claim 10 wherein said microcomputer includes an interrupt input and wherein:
    said interrupt signal is applied to said interrupt input of said microcomputer.

12. A computer system as defined in claim 11 wherein:
    said interrupt signal is set by a programmed instruction of said computer and is reset by a programmed instruction of said computer.

13. A computer system comprising:
    a programmable computer with an address bus, a data bus, means for generating control signals, and means for generating a clock signal;
    a speech processor having a voice synthesizer, speech memory, and a programmable microcomputer having means for connecting said speech memory to said voice synthesizer and programmed with control programs to scan said speech memory and respond to data entries therein by transferring data from said speech memory to said voice synthesizer;
    means for generating a memory read data signal, a memory write data signal, and a memory address signal; causing the selective transfer of data from said computer into said speech memory or from said speech memory into said computer;
    said control signal generating means including means for generating an enable signal which connects said computer to said microcomputer and is arranged to initiate operation of the control programs stored in the microcomputer when said enable signal is generated; and
    a program set controlling the operation of said computer including data write command sequences which cause data to be transferred to said speech memory from said computer and said write signal to be generated, data read command sequences which cause data to be transferred from said speech memory to said computer and said read signal to be generated, and sound processor enabling command sequences which cause said control signal generating means to generate said enable signal.

14. A computer system as defined in claim 13 wherein said means for generating a write data signal includes:
    means for decoding the coincidence of a write control signal from said computer and a speech memory select signal from said computer.

15. A computer system as defined in claim 14 wherein said means for generating a data read signal includes:
    means for decoding to coincidence of a read control signal from said computer and a speech memory select signal from said computer.

16. A computer system as defined in claim 15 wherein said speech memory is dynamic random access memory and said memory address signal generating means includes:
    means responsive to said clock signal from said computer for generating a row address strobe followed by a column address strobe to enable single locations of said speech memory.

17. A computer system as defined in claim 16 wherein said memory address signal generating means further includes:
- counter means, connected to the address inputs of said speech memory, selecting the locations of said memory which will be read from or written into;
- wherein said counter means is incremented in response to said memory address signal generating means accessing said speech memory; and
- means responsive to a control signal from said computer for generating a reset signal which is applied to said counter means to reset the location of said speech memory addressed to its initial location.

18. A computer system as defined in claim 17 which further includes:
- buffer means, responsive to a read data signal, for connecting to output of said speech memory to said data bus of the computer.

19. A computer system as defined in claim 18 which further includes:
- means for generating a refresh signal in response to a periodic control signal to cause a refresh cycle of said speech memory.

20. A computer system as defined in claim 19 which further includes:
- a refresh counter, having its output connected to the address inputs of said speech memory and incremented by said refresh signal, for selectively causing a refresh cycle for sequential locations of said speech memory.

21. A computer system as defined in claim 20 which further includes:
- means for selectively applying the output of said counter means or said refresh counter to the address inputs of said speech memory depending upon the state of said refresh signal.

* * * * *